United States Patent
Sneitzer

(10) Patent No.: US 11,435,580 B1
(45) Date of Patent: Sep. 6, 2022

(54) HIGH DYNAMIC RANGE HEAD-UP DISPLAY

(71) Applicant: Rockwell Collins, Inc., Cedar Rapids, IA (US)

(72) Inventor: David R. Sneitzer, Tigard, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 106 days.

(21) Appl. No.: 16/137,086

(22) Filed: Sep. 20, 2018

(51) Int. Cl.
   G02B 27/01 (2006.01)
   G02B 27/10 (2006.01)
   B64D 43/00 (2006.01)
   G01C 23/00 (2006.01)

(52) U.S. Cl.
   CPC ......... G02B 27/0101 (2013.01); B64D 43/00 (2013.01); G01C 23/005 (2013.01); G02B 27/1066 (2013.01); G02B 2027/0118 (2013.01)

(58) Field of Classification Search
   CPC ............ G02B 27/0101; G02B 27/1066; G02B 2027/0118; B64D 43/00; G01C 23/005
   USPC ............................................................ 345/7
   See application file for complete search history.

(56) References Cited

U.S. PATENT DOCUMENTS

| | | | | |
|---|---|---|---|---|
| 8,416,151 B2 * | 4/2013 | Poussin | ................ | G02B 27/01 345/7 |
| 8,487,786 B1 * | 7/2013 | Hussey | ............... | G08G 5/0021 340/955 |
| 2005/0024325 A1 * | 2/2005 | Fleischmann | ......... | G06F 3/0346 345/156 |
| 2015/0092083 A1 * | 4/2015 | Lam | .................... | G02B 27/017 348/234 |
| 2015/0243068 A1 * | 8/2015 | Solomon | ............... | H01L 27/156 345/419 |
| 2018/0211635 A1 * | 7/2018 | Ishibashi | ............ | G02B 27/0101 |
| 2019/0339519 A1 * | 11/2019 | Toki | ....................... | G06F 3/147 |

FOREIGN PATENT DOCUMENTS

WO   WO-2018139139 A1 *  8/2018  ............... G09G 5/38

* cited by examiner

*Primary Examiner* — Amare Mengistu
*Assistant Examiner* — Gloryvid Figueroa-Gibson
(74) *Attorney, Agent, or Firm* — Suiter Swantz pc llo

(57) ABSTRACT

A head-up display (HUD) may include at least one HUD sensor configured to acquire one or more images of a field of view (FOV). The HUD may include a HUD image combiner configured to present HUD symbology to a user, a HUD image projector configured to project the HUD symbology onto or through the HUD image combiner, and at least one processor communicatively coupled to the at least one HUD sensor and the HUD image projector. The at least one processor may be configured to process the one or more images for luminance data of the FOV, generate a dynamic map including a grid with one or more controllable cells based on the luminance data of the FOV via a dynamic map generation unit, and configure the HUD image projector based on the generated dynamic map to improve an average contrast ratio of the HUD image projector.

18 Claims, 12 Drawing Sheets

HIGH DYNAMIC RANGE HEAD-UP DISPLAY

BACKGROUND OF THE INVENTION

One of the most important performance characteristics of a display is contrast ratio CR, which is based on luminance (e.g., the intensity of light emitted from a surface per unit area travelling in a specified direction) of the pixels of the display. The contrast ratio for a pixel may be characterized by the ratio between a level of luminance (of a pixel when fully lit compared to a level of luminance when the pixel is fully unlit, or $$CR_{pixel} = L_{on}/L_{off}).$$

The contrast ratio for the display may be characterized as an average of the contrast ratios of each pixel, or $$CR_{avg} = 1/n * \sum_{1}^{n} CR_{pixel,i}.$$

The luminance L (candela/square meter, or cd/m$^2$) may be calculated as $$L = d^2\Phi/d\Sigma * d\Omega_\Sigma * \cos\theta_\Sigma,$$

where $d\Sigma$ is an infinitesimal area (m$^2$) of a source containing the specified point, $d\Omega_\Sigma$ is an infinitesimal solid angle (sr) containing the specified direction, $d^2\Phi$ is the luminous flux (lm) leaving the area $d\Sigma$ in any direction contained inside the solid angle $d\Omega_\Sigma$, and $\theta_\Sigma$ is the angle between the normal $n_\Sigma$ to the surface $d\Sigma$ and the specified direction.

A head-up display (HUD) is a particular type of display that provides enhanced situational awareness required for a particular phase of flight by allowing a pilot or other crew member to fly an aircraft heads-up and eyes-out while focusing both on the real world and on information displayed by the HUD. Determining the CR of a HUD is more complex than a standard display, as the luminance when the HUD pixel is fully unlit ($L_{off,HUD}$) includes a contribution from a fully unlit pixel ($L_{off}$) and a contribution of real-world brightness at the location of the symbology of interest on the HUD ($L_{RW}$), or $L_{off,HUD}=L_{off}+L_{RW}$.

A single sensor may be utilized to determine the average ambient light level over the entire field of view (FOV) of the HUD. The average ambient light level may be used with the brightness setting or contrast setting of the display to control the average contrast ratio $CR_{avg}$ over the field of view to set the backlight brightness for the HUD. A single sensor, however, may not provide enough control when the contribution of real-world brightness across the HUD may be different enough to affect the average contrast ratio $CR_{avg}$. For example, clouds over only a portion of the HUD pixels when flying into sunlight may cause the contrast ratio to vary greatly (e.g., the field of view may be flooded with red). By way of another example, changes in the real-world view (e.g., dark tree-covered land versus light sky) may cause the contrast ratio to vary greatly as well. In these examples, either the contrast needed to resolve an image may not be achievable for some parts of the field, or the brightness of the HUD may need to be increased to an undesirable level to compensate.

Therefore, it would be advantageous to provide a system and method that cures the shortcomings described above.

SUMMARY

In one aspect, embodiments of the inventive concepts disclosed herein are directed to a head-up display (HUD). The HUD may include a HUD image combiner configured to present HUD symbology to a user. The HUD may include a HUD image projector configured to project the HUD symbology at least one of onto or through the HUD image combiner. The HUD may include at least one HUD sensor configured to acquire one or more images of a field of view (FOV). The HUD may include at least one processor communicatively coupled to one or more of the at least one HUD sensor or the HUD image projector. The at least one processor may be configured to process the one or more images for luminance data of the FOV. The at least one processor may be configured to generate a dynamic map including a grid with one or more controllable cells based on the luminance data of the FOV via a dynamic map generation unit. The at least one processor may be configured to configure the HUD image projector based on the generated dynamic map to improve an average contrast ratio of the HUD image projector.

In a further aspect, embodiments of the inventive concepts disclosed herein are directed to a method for operating a head-up display (HUD). The method may include acquiring one or more images of a field of view (FOV) via at least one HUD sensor. The method may include processing the one or more images for luminance data of the FOV via at least one processor. The method may include generating a dynamic map including a grid with one or more controllable cells based on the luminance data of the FOV via a dynamic map generation unit of the at least one processor. The method may include configuring a HUD image projector based on the generated dynamic map to improve an average contrast ratio of a HUD image projector. The at least one processor may be communicatively coupled to one or more of the at least one HUD sensor or the HUD image projector.

In a further aspect, embodiments of the inventive concepts disclosed herein are directed to a system. The system may include at least one non-transitory computer-readable medium. The system may include at least one aircraft processor communicatively coupled to the at least one non-transitory computer-readable medium. The system may include at least one HUD sensor communicatively coupled to the at least one aircraft processor. The at least one HUD sensor may be configured to acquire one or more images of a field of view (FOV). The system may include a head up-display (HUD) communicatively coupled with the at least one aircraft processor. The HUD may include a HUD image combiner configured to present HUD symbology to a user. The HUD may include a HUD image projector configured to project the HUD symbology at least one of onto or through the HUD image combiner. The HUD may include at least one HUD processor communicatively coupled to one or more of the at least one HUD sensor or the HUD image projector. The at least one processor may be configured to process the one or more images for luminance data of the FOV. The at least one processor may be configured to generate a dynamic map including a grid with one or more controllable cells based on the luminance data of the FOV via a dynamic map generation unit. The at least one processor may be configured to configure the HUD image projector based on the generated dynamic map to improve an average contrast ratio of the HUD image projector.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1A:
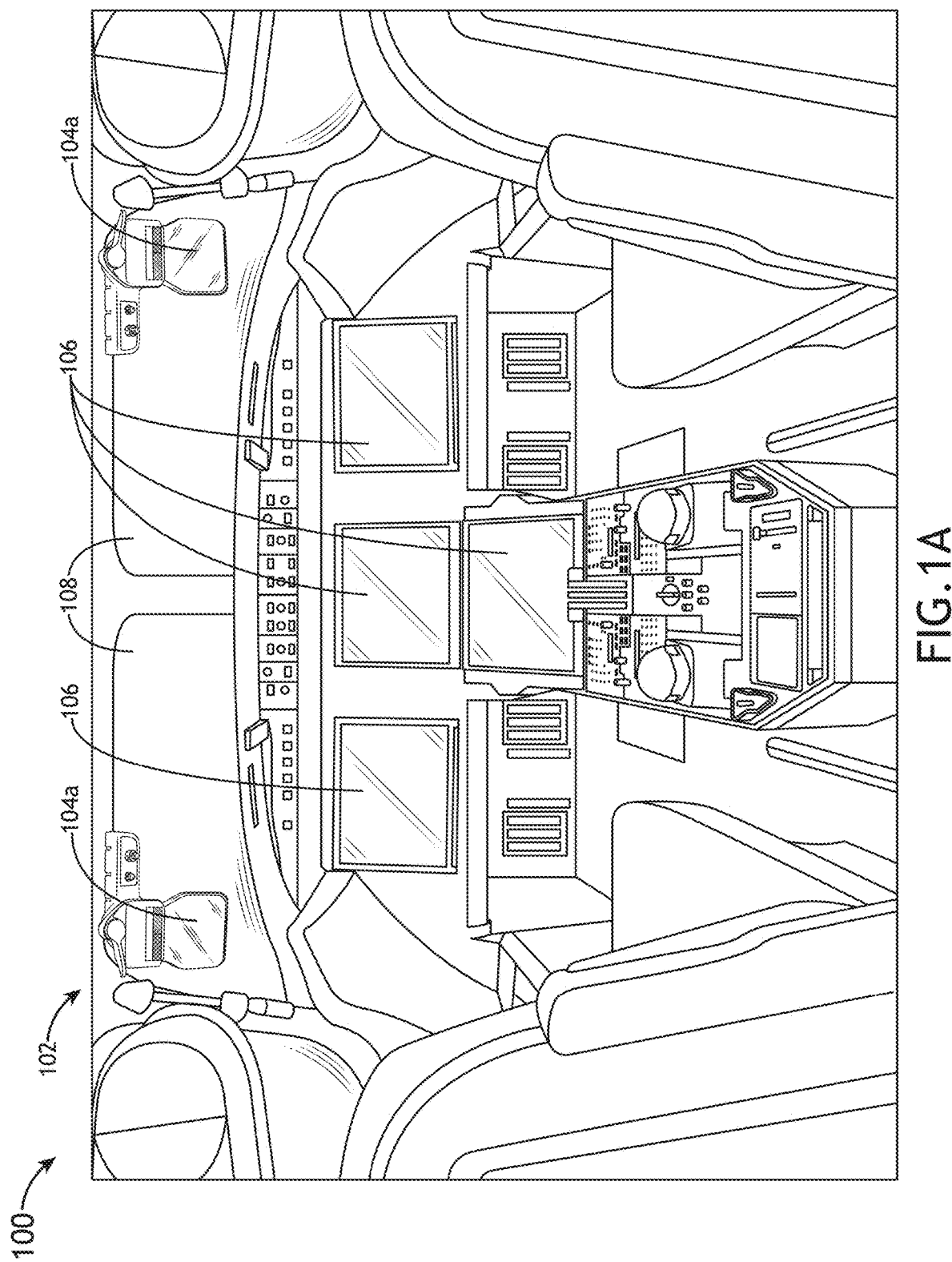
FIG. 1A is an exemplary embodiment of an avionics environment in which a high dynamic range head-up display may be implemented according to the inventive concepts disclosed herein.

Reference will now be made in detail to the subject matter disclosed, which is illustrated in the accompanying drawings.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, any arrangement of components to achieve a same functionality is effectively "associated" such that the desired functionality is achieved, such that any two components herein combined to achieve a particular functionality can be seen as "associated with" each other (irrespective of architectures or intermedial components). Any two components so associated can also be viewed as being "operably connected" or "operably coupled" to each other to achieve the desired functionality, and any two components capable of being so associated can also be viewed as being "operably couplable" to each other to achieve the desired functionality. Examples of operably couplable include, but are not limited to, physically mateable and/or physically interacting components, wirelessly interactable and/or wirelessly interacting components, logically interacting and/or logically interactable components, or the like.

Further, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of or sub-combination of two or more such features, along with any other features which may not necessarily be expressly described or inherently present in the instant disclosure.

FIGS. 1A-9 generally illustrate exemplary embodiments of a high dynamic range head-up display in accordance with the inventive concepts disclosed herein.

Broadly, embodiments of the inventive concepts disclosed herein are directed to a high dynamic range head-up display. More particularly, embodiments of the inventive concepts disclosed herein are directed to a high dynamic range head-up display configured to provide an improved (e.g., optimized and/or uniform) average contrast ratio to a viewer by sensing real-world brightness and manipulating backlight brightness over a grid of independently controlled cells.

Figure 1B:
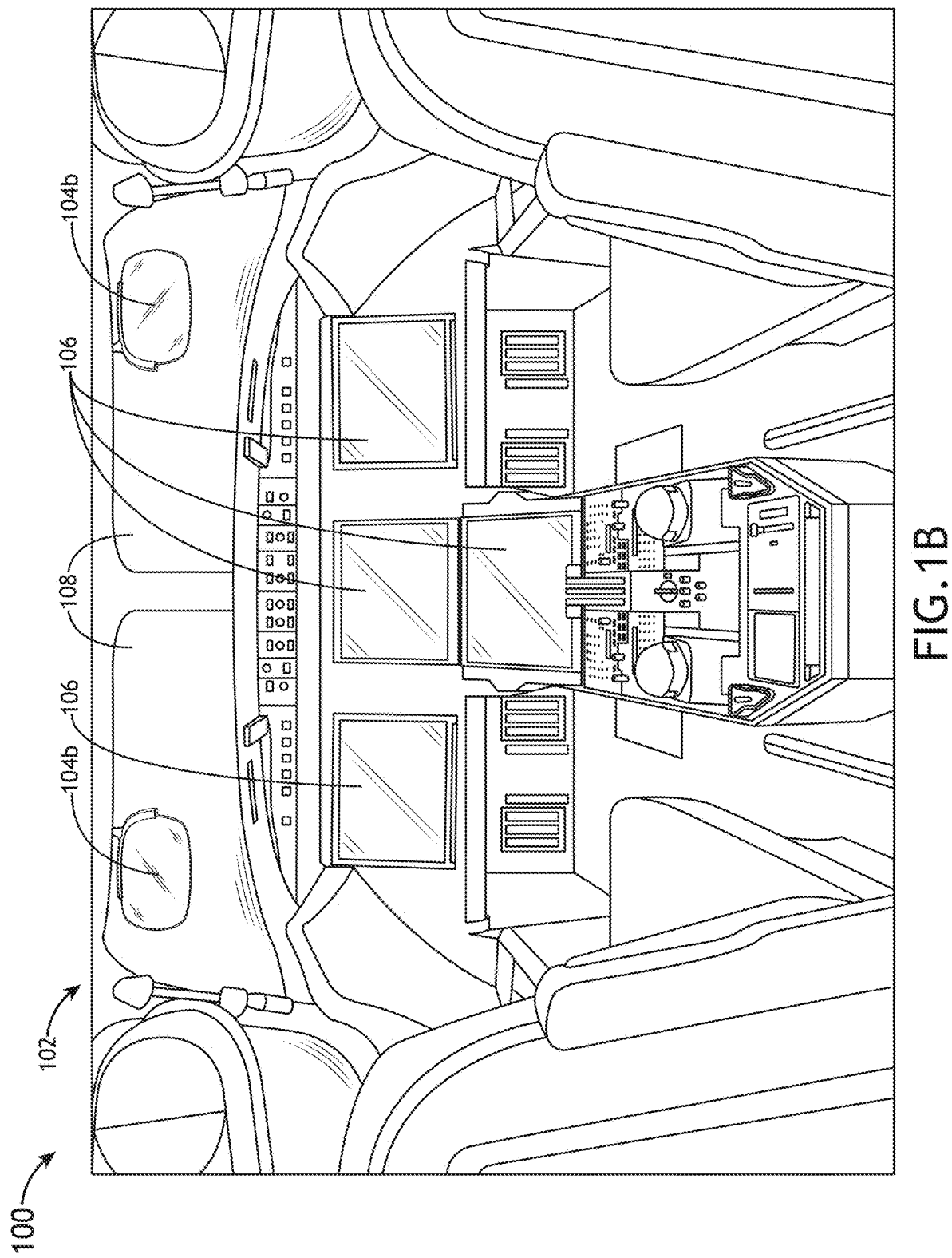
FIG. 1B is an exemplary embodiment of an avionics environment in which a high dynamic range head-up display may be implemented according to the inventive concepts disclosed herein.
Figure 1C:
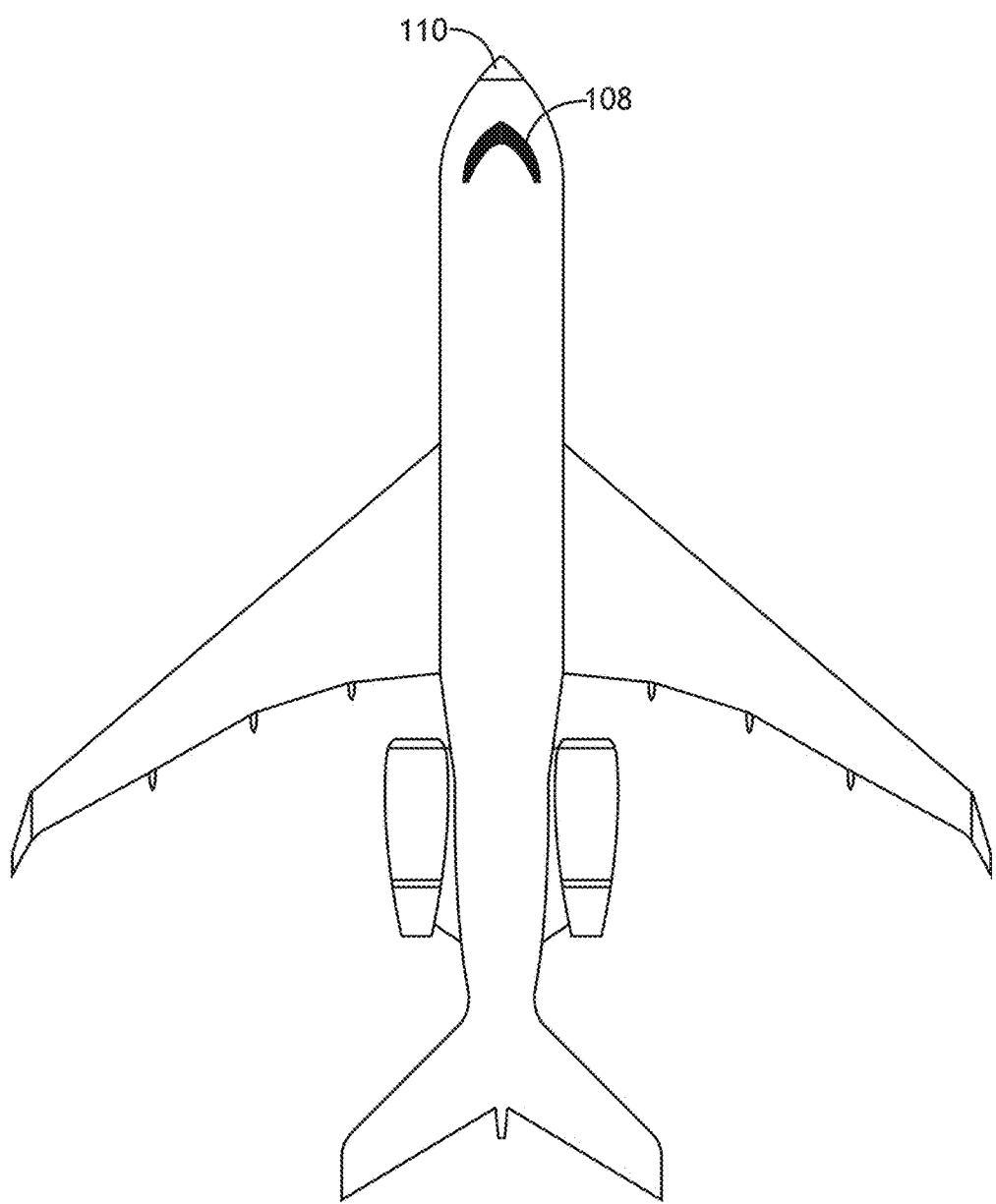
FIG. 1C is an exemplary embodiment of an avionics environment in which a high dynamic range head-up display may be implemented according to the inventive concepts disclosed herein.

FIGS. 1A-1C illustrate exemplary embodiments of an avionics environment in which a high dynamic range head-up display may be implemented according to the inventive concepts disclosed herein. For example, as illustrated in FIGS. 1A-1C, the avionics environment may include, but is not limited to, an aircraft 100.

Referring now to FIGS. 1A and 1B, the avionics environment (e.g., the aircraft 100) may include a cockpit 102. The cockpit 102 may include one or more high dynamic range (HDR) head-up displays (HUDs). For example, as illustrated in FIG. 1A, the cockpit 102 may include one or more HUDs 104a. By way of another example, as illustrated in FIG. 1B, the cockpit 102 may include one or more HUDs 104b. The one or more HUDs 104a, 104b may be employed to present flight data including, but not limited to situational awareness data and/or flight queue data to a pilot or other crew member. For example, the situational awareness data may be based on, but is not limited to, aircraft performance parameters, aircraft performance parameter predictions, sensor readings, alerts, or the like. The avionics environment (e.g., the cockpit 102) may include any number of display devices (e.g., one, two, three, or more displays) such as, but not limited to, the one or more HUDs 104a, 104b, one or more head-down displays (HDDs) 106, one or more multi-function displays (MFDs), or the like.

Referring now to FIG. 1C, the avionics environment (e.g., the aircraft 100) may include a windshield 108 (e.g., proximate to the cockpit 102). The avionics environment (e.g., the aircraft 100) may include a nosecone 110.

Where the environment includes an avionics environment, it is noted herein the high dynamic range head-up display may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Although exemplary embodiments of the present disclosure are directed to an avionics environment, it is noted herein the high dynamic range head-up display may be configured to operate in any type of vehicle known in the art. For example, the vehicle may be any air, land, or water-based personal equipment or vehicle; any air, land, or water-based commercial equipment or vehicle; any air, land, or water-based military equipment or vehicle known in the art. For instance, the vehicle may include an automobile, a watercraft, a submersible vehicle, a spacecraft, or the like. Therefore, the above description should not be interpreted as a limitation on the present disclosure but merely an illustration.

Although exemplary embodiments of the present disclosure are directed to a vehicle including the high dynamic range head-up display, it is noted herein the high dynamic range head-up display may be coupled to and/or configured to operate in any type of environment known in the art. For example, the high dynamic range head-up display may be coupled to and/or configured to operate in a fixed or mobile, indoor or outdoor, environment. By way of another example, a high dynamic range head-up display may be integrated within a projection system for commercial or industrial use in either a home or a business. Therefore, the above description should not be interpreted as a limitation on the present disclosure but merely an illustration.

Figure 2:
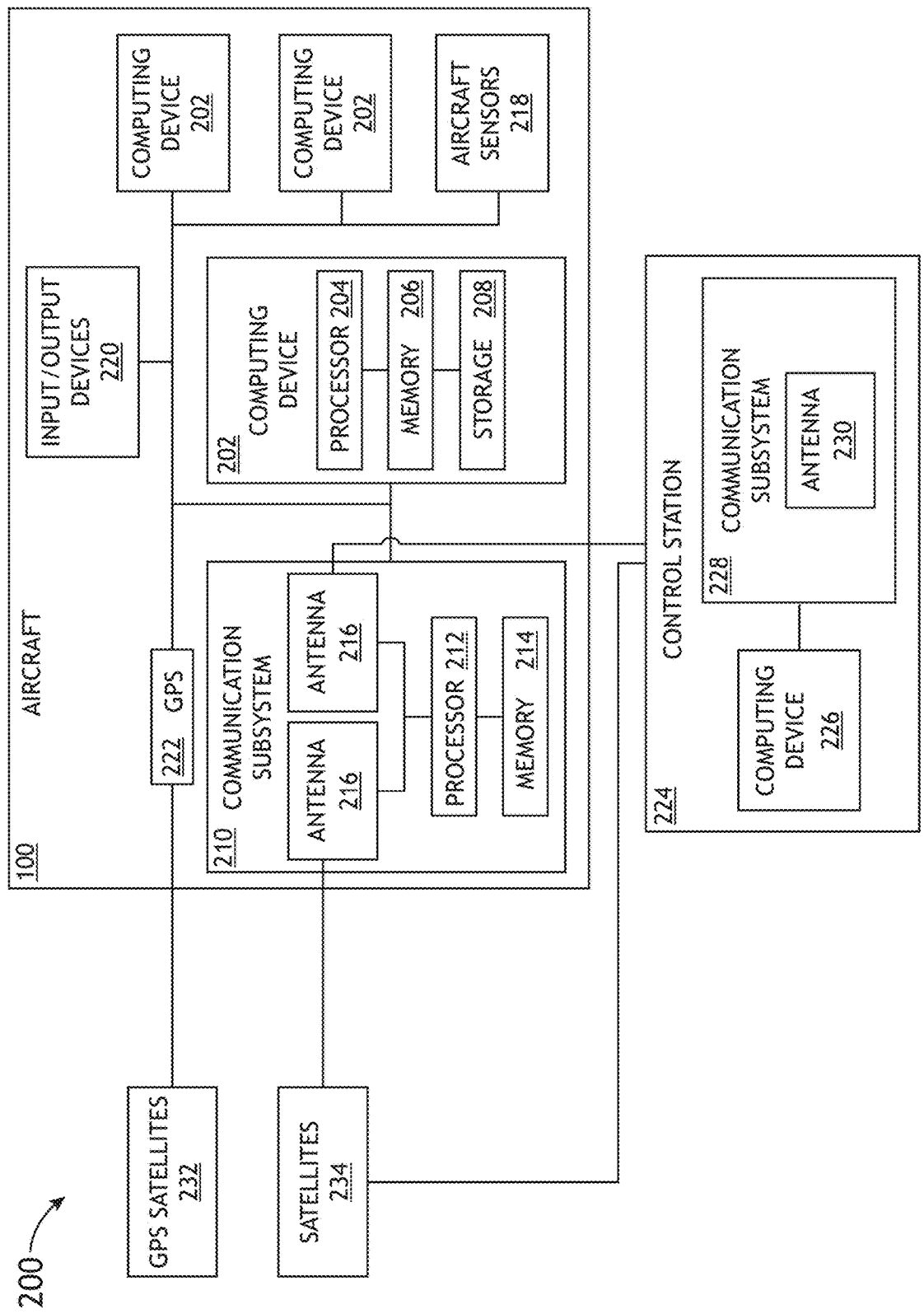
FIG. 2 illustrates an exemplary embodiment of a system configured to include a high dynamic range head-up display according to the inventive concepts disclosed herein.

FIG. 2 illustrates an embodiment of a system 200 including the aircraft 100 according to the inventive concepts disclosed herein.

The system 200 may include the one or more aircraft 100. The aircraft 100 may include one or more computing devices 202. For example, the one or more computing devices 202 may include, but are not limited to, one or more vehicular computing devices (e.g., one or more aircraft 100 computing devices), one or more vetronics computing devices (e.g., one or more avionics computing devices), or the like. A computing device 202 may include one or more processors 204, memory 206, storage 208, and/or other components, equipment, or devices commonly included in a computing device, some or all of which may be communicatively coupled.

The aircraft 100 may include one or more communication subsystems 210. A communication subsystem 210 may include one or more processors 212, memory 214, one or more antennas 216, and/or other components, equipment, or devices commonly included in a computing device, some or all of which may be communicatively coupled.

The aircraft 100 may include one or more aircraft sensors 218. The aircraft 100 may include one or more input/output devices 220.

The aircraft 100 may include one or more global positioning system (GPS) devices 222. Some or all of the one or more computing devices 202, the one or more communication subsystems 210, the one or more aircraft sensors 218, the one or more input/output devices 220, the one or more GPS devices 222, and/or any other systems, equipment or devices commonly included in the aircraft 100 may be communicatively coupled.

The aircraft 100 may include a network operations center (NOC) or include components (e.g., one or more computing devices, one or more communication subsystems, or the like) configured to perform functionality similar to a NOC.

Although the one or more computing devices 202, the one or more communication subsystems 210, the one or more aircraft sensors 218, the one or more input/output devices 220, and/or the one or more GPS devices 222 are illustrated as separate devices or subsystems, it is noted herein that some or all of the one or more computing devices 202, the one or more communication subsystems 210, the one or more aircraft sensors 218, the one or more input/output devices 220, and/or the one or more GPS devices 222 may be implemented as a single integrated subsystem or device, or as any number of integrated and/or partially integrated subsystems and/or devices.

The system 200 may include one or more control stations 224. The one or more control stations 224 may be implemented as a fixed location ground control station located on a ground plane of the earth (e.g., a ground control station of an air traffic control tower, a ground control station of a network operations center, or the like), an air control station implemented on an airborne vehicle (e.g., aircraft), a mobile ground control station implemented on a non-airborne vehicle (e.g., an automobile, a ship, a trailer, or the like), or the like.

The one or more control stations 224 may include a network operations center (NOC) and/or be communicatively coupled to a NOC.

A control station 224 may include one or more computing devices 226. The one or more computing devices 226 may include one or more processors, memory, and/or storage, some or all of which may be communicatively coupled. The control station 224 may include one or more communication subsystems 228, where a communication system 228 may include one or more antennae 230.

The one or more computing devices 202, 226 may be a computer including, but not limited to, a desktop computer, a mainframe computer system, a workstation, an image computer, a parallel processor, a networked computer, or the like. The one or more computing devices 202, 226 may include, may be implemented as, and/or may be configured to perform the functionality of any suitable vehicular system. For example, the one or more computing devices 202, 226 may include, may be implemented as, and/or may be configured to perform any suitable aircraft system such as a flight management system (FMS), a processing and video generation system computing device, a crew alerting system (CAS) computing device (e.g., an engine indication and crew alerting system (EICAS) computing device), an integrated flight information system (IFIS) computing device, an information management system (IMS) computing device, an onboard maintenance system (OMS) computing device, a terrain awareness and warning system (TAWS) computing device, an electronic instrument system (EIS) computing device, or the like.

The one or more processors 204, 212 may include any one or more processing elements known in the art. In this sense, the one or more processors 204, 212 may include any microprocessor device configured to execute algorithms and/or program instructions. In general, the term "processor" may be broadly defined to encompass any device having one or more processing elements, which execute one or more sets of program instructions from a non-transitory memory medium (e.g., the memory 206, 214), where the one or more sets of program instructions is configured to cause the one or more processors 204, 212 to carry out any of one or more process steps. For example, the one or more processors 204, 212 may include one or more radiofrequency (RF) processors.

The memory 206, 214 may include any storage medium known in the art suitable for storing the one or more sets of program instructions executable by the associated one or more processors 204, 212. For example, the memory 206, 214 may include a non-transitory memory medium. For instance, the memory 206, 214 may include, but is not limited to, a read-only memory (ROM) (e.g., at least one electrically erasable programmable ROM (EEPROM), or the like), at least one on-processor memory (e.g., at least one on-processor cache, at least one on-processor buffer, at least one on-processor flash memory, at least one on-processor EEPROM, or the like), a random access memory (RAM), or the like.

The storage 208 may include a magnetic or optical memory device (e.g., a hard-disk drive, at least one readable and/or writable disk of at least one optical drive configured to read from and/or write to the at least one readable and/or writable disk, or the like), a tape drive, a solid-state drive, a flash drive, or the like.

The memory 206, 214 and/or the storage 208 may be configured to provide display information to a display device (e.g., the one or more HUDs 104a, 104b; the HDDs 106, or the like). The memory 206, 214 may be configured to store information input via the one or more input/output devices 220. The memory 206, 214 and/or the storage 208 may be housed in a common controller housing with the one or more processors 204, 212. The memory 206, 214 and/or the storage 208 may, alternatively or in addition, be located remotely with respect to the spatial location of the one or more processors 204, 212 and/or the one or more computing devices 202, 226. For instance, the one or more processors 204, 212 and/or the one or more computing devices 202, 226 may access a remote memory 206, 214 (e.g., server) and/or remote storage 208, accessible through a network (e.g., internet, intranet, and the like) via the one or more communication subsystems 210, 228.

The one or more computing devices 202, 226 may be configured to receive and/or acquire data or information from other systems or tools via the one or more communication subsystems 210, 228 that may include wireline and/or wireless portions (e.g., the antennae 216, 230, a cabled connection, a wired connection, or the like). In addition, the one or more computing devices 202, 226 may be configured to transmit data or information (e.g., the output of one or more procedures of the inventive concepts disclosed herein) to one or more systems or tools via the one or more communication subsystems 210, 228 that may include wireline and/or wireless portions (e.g., the antennae 216, 230, a cabled connection, a wired connection, or the like). In this regard, the transmission medium may serve as a data link between the one or more computing devices 202, 226 and other subsystems. In addition, the one or more computing devices 202, 226 may be configured to send data to external systems via a transmission medium (e.g., network connection).

The antennae 216, 230 may be implemented as or may include any suitable antenna or antenna device. For example, the antennae 216, 230 may be implemented as or include at least one electronically scanned array (ESA) (e.g., at least one active ESA (AESA)), at least one radio (e.g., at least one software defined radio (SDR)), at least one transmitter, at least one receiver, at least one transceiver, or a combination thereof.

Although the one or more antennae 216, 230 are illustrated as being implemented on the one or more aircraft 100 and/or the one or more control stations 224, the one or more antennae 216, 230 may be implemented in and/or coupled to a personal electronic device, a mobile communication system (e.g., a man pack communication system), or the one or more satellites 132. For example, the personal electronic device may include a handheld computer such as, but not limited to, a smartphone, a tablet, a phablet, or the like. By way of another example, the personal electronic device may include a laptop computer such as, but not limited to, a laptop with a single-fold hinge, a laptop with a double-fold hinge, a laptop with a twist-and-fold hinge, a laptop with a detachable display device and/or a detachable user input device, or the like.

It is noted herein that any description of the one or more computing devices 202 may extend to the one or more computing devices 226, subject to any configurations and/or adjustments necessary to operate the one or more computing devices 226 in a fixed location instead of in a mobile capacity. In addition, it is noted herein that any description of the one or more communication subsystems 210 may be extended to the one or more communication subsystems 228, subject to any configurations and/or adjustments necessary to operate the one or more communication subsystems 228 in a fixed location instead of in a mobile capacity. Further, it is noted herein that any description of the one or more antennae 216 may extend to the one or more antennae 230, subject to any configurations and/or adjustments necessary to operate the one or more antennae 230 in a fixed location instead of in a mobile capacity. Therefore, the above description should not be interpreted as a limitation on the present disclosure but merely an illustration.

The system 200 may include one or more GPS satellites 232. The system 200 may include one or more satellites 234. Some or all of the one or more aircraft 100, the one or more control stations 224, the one or more GPS satellites 232, or the one or more satellites 234 may be communicatively coupled.

The one or more GPS devices 222 may receive location data from the one or more GPS satellites 232 and may provide vehicular location data (e.g., aircraft location data) to any of various equipment/systems of the one or more aircraft 100 (e.g., the one or more computing devices 202, the one or more communication subsystems 210, the one or more aircraft sensors 218, and/or the one or more input/output devices 220). For example, the one or more GPS devices 222 may be implemented as a global navigation satellite system (GNSS) device, and the one or more GPS satellites 232 may be implemented as GNSS satellites. The one or more GPS devices 222 may include a GPS receiver and a processor. For example, the one or more GPS devices 222 may receive or calculate location data from a sufficient number (e.g., at least four) of GPS satellites 232 in view of the aircraft 100 such that a GPS solution may be calculated. In some embodiments, the one or more GPS devices 222 may be implemented as or as part of the one or more computing devices 202, the one or more communication subsystems 210, the one or more aircraft sensors 218, and/or the one or more input/output devices 220. The one or more GPS devices 222 may be configured to provide the location data to any of various equipment/systems of a vehicle. For example, the one or more GPS devices 222 may provide location data to the one or more computing devices 202, the one or more communication subsystems 210, the one or more aircraft sensors 218, and/or the one or more input/output devices 220.

Although the present disclosure is directed to the system 200 including components such as the one or more aircraft 100, the one or more control stations 224, the one or more GPS satellites 232, and/or the one or more satellites 234, it is noted herein that a subset of the components of the system 200 may be optional. Therefore, the above description should not be interpreted as a limitation on the present disclosure but merely an illustration.

Figure 3:
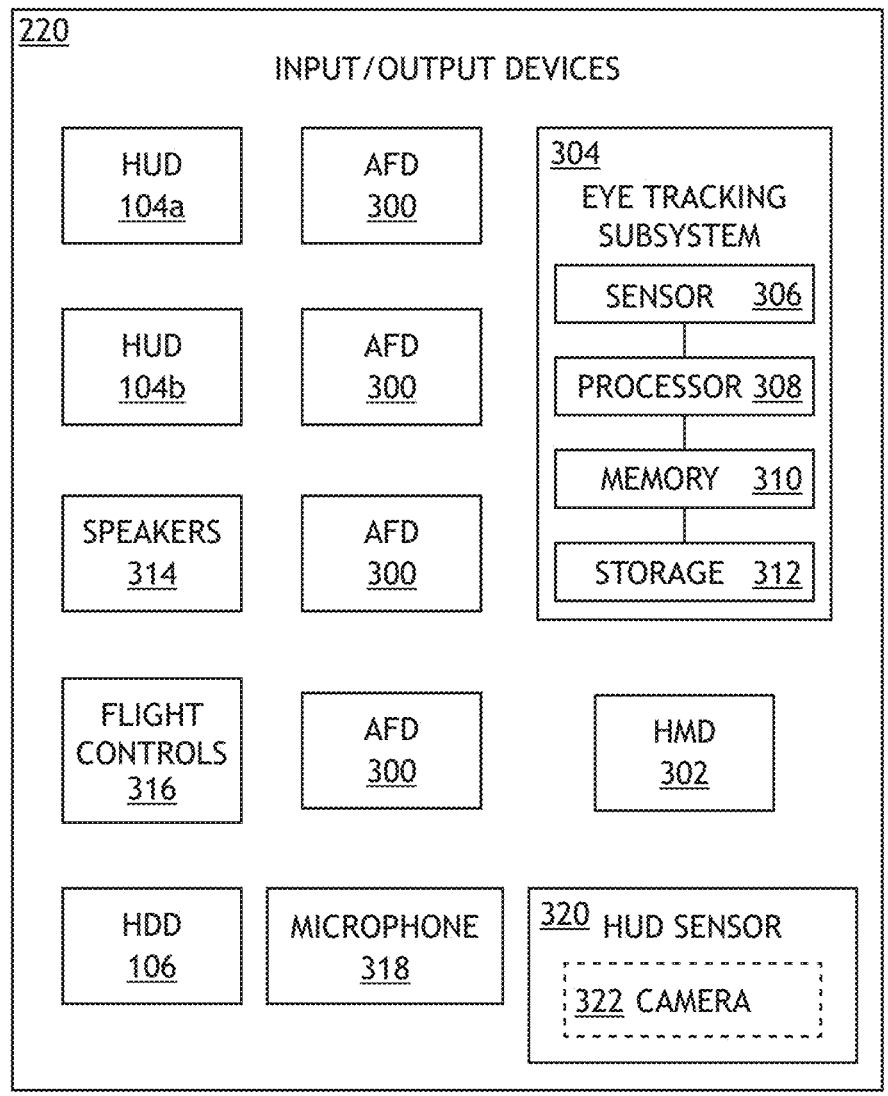
FIG. 3 illustrates an exemplary embodiment of one or more input/output devices of an aircraft including a high dynamic range head-up display according to the inventive concepts disclosed herein.

FIG. 3 illustrates an embodiment of the one or more input/output devices 220 of the aircraft 100 according to the inventive concepts disclosed herein.

The one or more input/output devices 220 may include one or more displays. For example, the one or more displays may include the one or more HUDs 104a, 104b, the one or more HDDs 106 (e.g., one or more primary flight HDDs, one or more secondary flight HDDs, one or more multi-function displays (MFDs), or the like), one or more adaptive flight displays (AFDs) 300, and/or one or more head-worn displays 302 (e.g., one or more helmet-worn displays, one or more binocular displays, or the like) communicatively coupled to one or more other components of the aircraft 100 (e.g., components illustrated in FIG. 2).

The one or more display devices may include any display device known in the art. For example, the one or more display devices may include any display known in the art including, but not limited to, a cathode-ray tube (CRT) display, a transmissive display (e.g., an LCD display), an emissive display, an electronic paper (E-ink) display, a plasma display panel (PDP), a display light processing (DLP) display, or the like. For instance, the emissive display may include, but is not limited to, a light-emitting diode (LED) display, a micro-LED display, an organic light-emitting diode (OLED) display, an active-matrix OLED (AMOLED) display, a passive-matrix OLED (PMOLED) display, a light-emitting electrochemical cell (LEC) display or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more input/output devices 220 may include one or more eye tracking subsystems 304. An eye tracking subsystem 304 may include one or more sensors 306, one or more processors 308, memory 310, storage 312, and/or other components, equipment, or devices commonly included in an eye tracking system, some or all of which may be communicatively coupled. The one or more eye tracking subsystems 304 may be configured to track eye gestures, track movement of a user's eye, track a user's gaze, and/or otherwise receive inputs from a user's eyes. The one or more eye tracking subsystems 304 may be configured for performing fully automatic eye tracking operations of users in real time.

The one or more sensors 306 of the eye tracking system 304 may be implemented as any of various sensors suitable for an eye tracking system. For example, the one or more sensors 306 may include or be implemented as one or more optical sensors. For instance, the one or more optical sensors may include one or more cameras configured to acquire images in an electromagnetic spectrum range including, but not limited to, a visible light spectrum range (e.g., 400 nanometers (nm)-700 nm), an infrared spectrum range (e.g., 700 nm-1000 nm or 1 millimeter (mm)), an ultraviolet spectrum range (e.g., 10 nm-400 nm), or any other spectrum range known in the art. The one or more sensors 306 may include one or more dedicated eye tracking system sensors.

Although the one or more sensors 306 have been illustrated as being integrated within the eye tracking subsystem 304, it is noted herein the one or more sensors 306 may be implemented external to the eye tracking subsystem 304. For example, the one or more sensors 306 may be implemented as one or more optical sensors located within the aircraft 100 and communicatively coupled to the one or more processors 308 of the eye tracking system 304. Therefore, the above description should not be interpreted as a limitation on the present disclosure but merely an illustration.

The one or more processors 308 may be configured to process data received from the one or more sensors 306 and store the processed data in the memory 310 and/or storage 312. The one or more processors 308 may be configured to process data received from the one or more sensors 306 and output the processed data to one or more onboard devices or onboard systems of the aircraft 100 (e.g., the one or more computing devices 202, the one or more communication subsystems 210, the one or more aircraft sensors 218, other input/output devices 220, the one or more GPS devices 222, or the like).

It is noted herein that any description of the one or more processors 204, 212 (e.g., as illustrated in FIG. 2) may extend to the one or more processors 308. In addition, it is noted herein that any description of the memory 206, 214 (e.g., as illustrated in FIG. 2) may extend to the memory 310. Further, it is noted herein that any description of the storage 208 (e.g., as illustrated in FIG. 2) may extend to the storage 312. Therefore, the above description should not be interpreted as a limitation on the present disclosure but merely an illustration.

The one or more input/output devices 220 may include one or more speakers 314. The one or more input/output devices 220 may include one or more flight controls 316. The one or more input/output devices 220 may include one or more microphones 318.

The one or more input/output devices 220 may include any user input device known in the art. For example, the one or more input/output devices 220 may include, but are not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the one or more displays may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the input devices may include, but is not limited to, a bezel-mounted interface.

The one or more input/output devices 220 may be configured to present information to and/or configured to receive user inputs from the pilot or other crew member of the aircraft 100. For example, the one or more speakers 314 may be configured to audibly present audible information. By way of another example, the one or more displays may be configured to graphically present visual information. For instance, the one or more displays may be configured to graphically present synthetic vision content (e.g., streams of images as synthetic vision video), which may be used when the aircraft 100 is in a degraded visual environment.

The one or more input/output devices 220 may include one or more HUD sensors 320. For example, the one or more HUD sensors 320 may include or be implemented as one or more optical sensors. For instance, the one or more optical sensors may include one or more cameras 322 (e.g., one or more forward-facing cameras). The one or more cameras 322 may be configured to acquire images in an electromagnetic spectrum range including, but not limited to, the visible light spectrum range, the infrared spectrum range, the ultraviolet spectrum range, or any other spectrum range known in the art.

Figure 4:
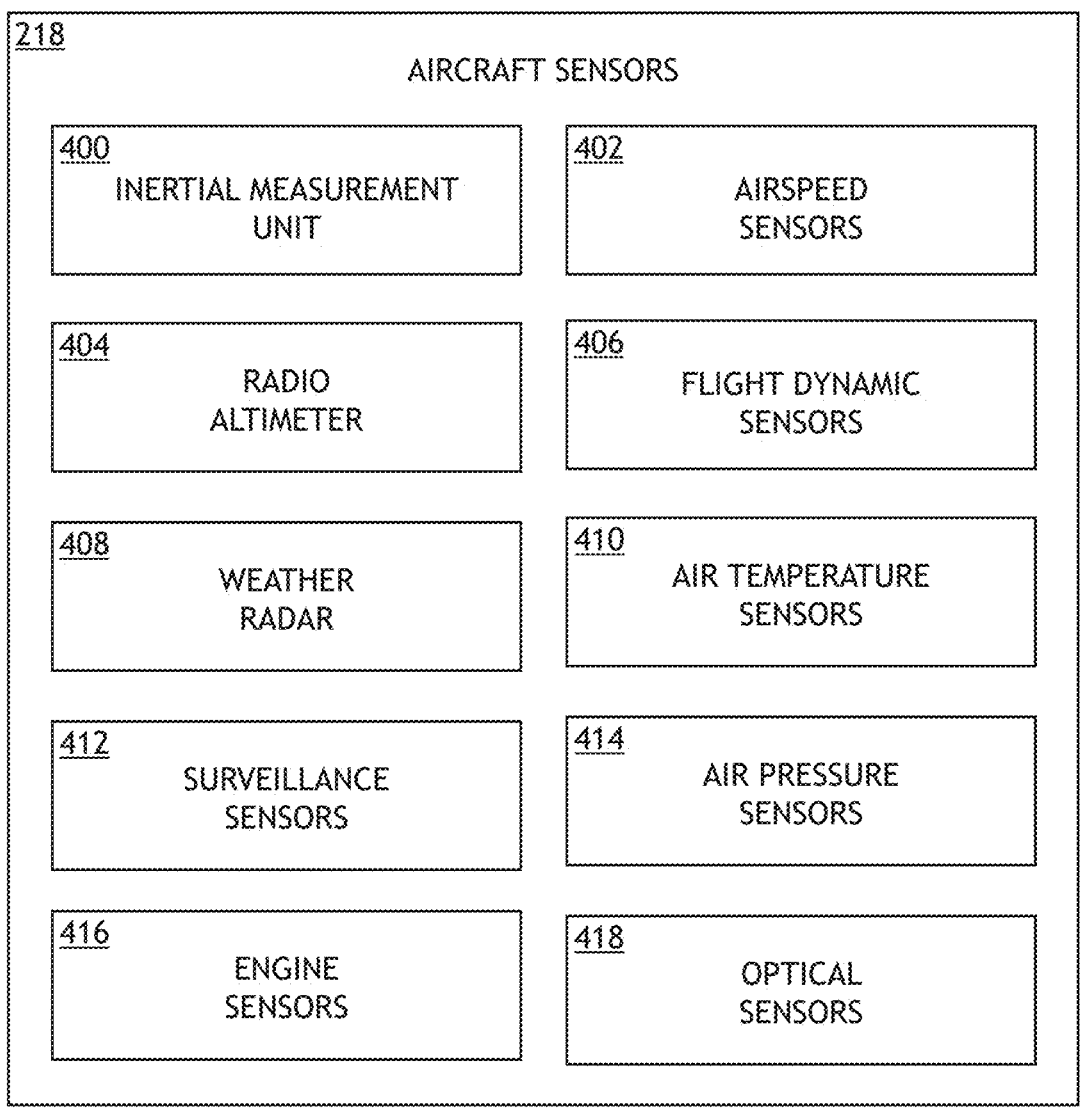
FIG. 4 illustrates an exemplary embodiment of one or more aircraft sensors of an aircraft including a high dynamic range head-up display according to the inventive concepts disclosed herein.

FIG. 4 illustrates an embodiment of the one or more aircraft sensors 218 of the aircraft 100 according to the inventive concepts disclosed herein.

The one or more aircraft sensors 218 may be configured to sense a particular condition(s) external or internal to the aircraft 100 and/or within the aircraft 100. The one or more aircraft sensors 218 may be configured to output data associated with particular sensed condition(s) to one or more onboard devices or onboard systems of the aircraft 100 (e.g., the one or more computing devices 202, the one or more communication subsystems 210, other aircraft sensors 218, the one or more input/output devices 220, the one or more GPS devices 222, or the like).

The one or more aircraft sensors 218 may include one or more inertial measurement units 400, one or more airspeed sensors 402, one or more radio altimeters 404, one or more flight dynamic sensors 406 (e.g., sensors configured to sense pitch, bank, roll, heading, and/or yaw), one or more weather radars 408, one or more air temperature sensors 410, one or more surveillance sensors 412, one or more air pressure sensors 414, one or more engine sensors 416, and/or one or more optical sensors 418 (e.g., one or more cameras configured to acquire images in an electromagnetic spectrum range including, but not limited to, the visible light spectrum range, the infrared spectrum range, the ultraviolet spectrum range, or any other spectrum range known in the art), some or all of which may be communicatively coupled. Additionally, the one or more GPS devices 222 may be considered one or more aircraft sensors 218.

The one or more aircraft sensors 218 may be implemented as navigation sensors (e.g., the one or more GPS devices 222, the one or more inertial measurement units 400, the one or more airspeed sensors 402, the one or more radio altimeters 404, the one or more flight dynamic sensors 406, the one or more weather radars 408, the one or more air temperature sensors 410, and/or the one or more air pressure sensors 414) configured to sense any of various flight conditions or aircraft conditions typically used by aircraft and output navigation data (e.g., aircraft location data, aircraft orientation data, aircraft direction data, aircraft speed data, and/or aircraft acceleration data). For example, the various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure.

The one or more aircraft sensors 218 (e.g., the one or more GPS devices 222 and/or the one or more inertial measurement units 400) may provide aircraft location data and aircraft orientation data, respectively, to a processor (e.g., a processor of the one or more processors 204, 212 as illustrated in FIG. 2, a processor of the one or more processors 308 as illustrated in FIG. 3, or the like).

The one or more aircraft sensors 218 (e.g., the engine sensors 416) may be configured to measure various conditions of at least one engine of the aircraft 100.

Figure 5:
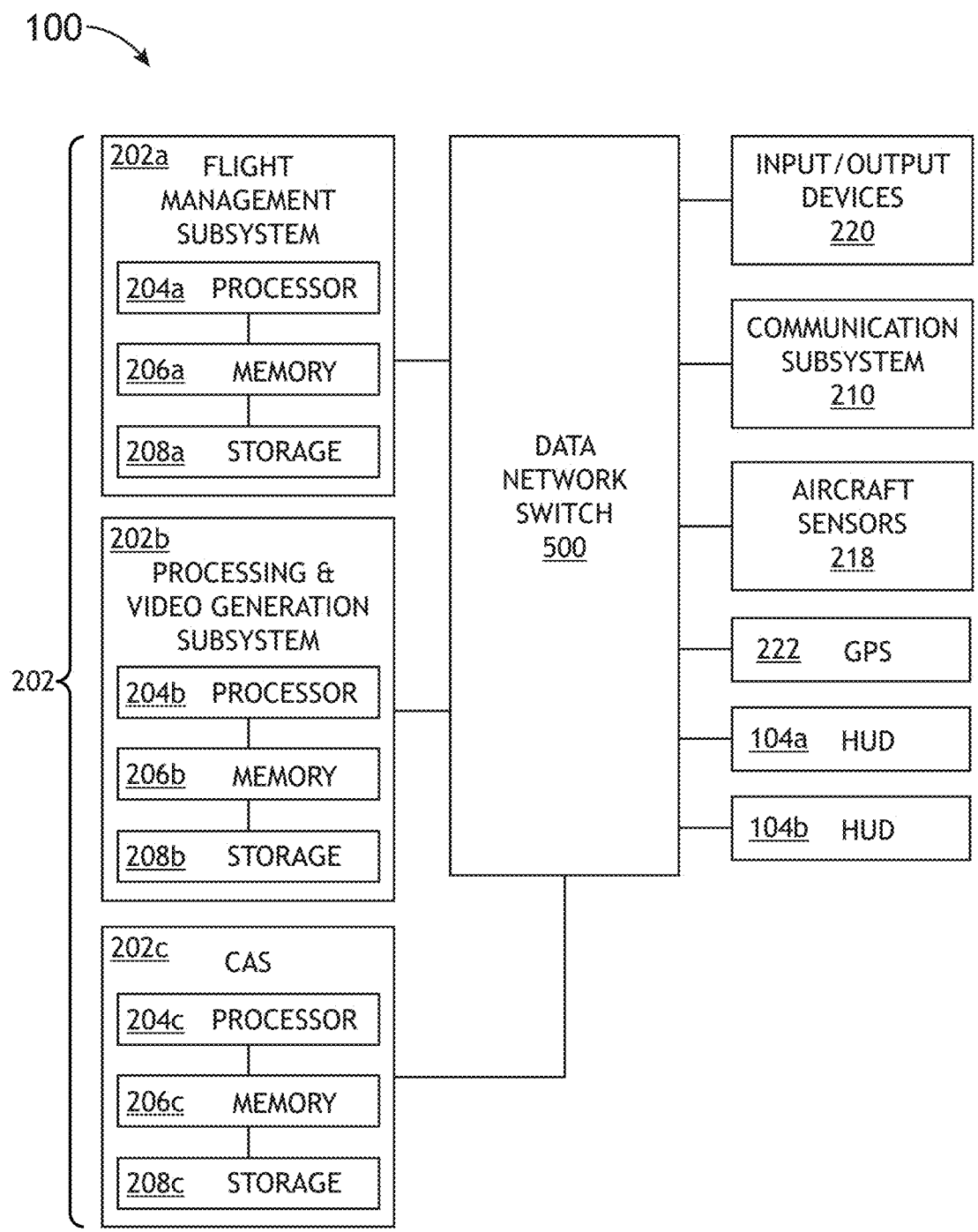
FIG. 5 illustrates an exemplary embodiment of an aircraft including a high dynamic range head-up display according to the inventive concepts disclosed herein.

FIG. 5 illustrates an embodiment of the aircraft 100 according to the inventive concepts disclosed herein.

The aircraft 100 may include a data network switch 500 (e.g., an avionics full-duplex Ethernet (AFDX) switch). For example, one or more components of the aircraft 100 including, but not limited to, the one or more of computing devices 202, the one or more input/output devices 220, the one or more communication subsystems 210, the one or more aircraft sensors 218, the one or more GPS devices 222, the one or more HUDs 104a, and/or the one or more HUDs 104b may be communicatively coupled via the data network switch 500. It is noted herein the aircraft 100 may include any suitable data networks and any suitable data networking components (e.g., at least one bus such as an ARINC 429 bus), at least one line replacement unit (LRU), at least one data concentrator, at least one switch, at least one router, or the like to supplement or replace the communicative coupling between the data network switch 500 and the one or more components of the aircraft 100.

The one or more computing devices 202 may be implemented as and/or include one or more avionics computing devices (e.g., which may be implemented in one or more integrated modular avionics (IMA) cabinets). For example, the one or more avionics computing devices may include a flight management system (FMS) computing device 202a, a processing and video generation system computing device 202b, and/or a crew alerting system (CAS) computing device 202c.

The computing devices 202a, 202b, 202c may include one or more processors 204a, 204b, 204c, respectively. The computing devices 202a, 202b, 202c may include memory 206a, 206b, 206c, respectively. The computing devices 202a, 202b, 202c may include storage 208a, 208b, 208c, respectively. It is noted herein that any description of the one or more computing devices 202 or components of the one or more computing devices 202 may extend to the FMS computing device 202a or components of the FMS computing device 202a, the processing and video generation system computing device 202b or components of the processing and video generation system computing device 202b, and/or the CAS computing device 202c or components of the CAS computing device 202c.

The FMS computing device 202a may be configured to automate various in-flight tasks, such as managing a flight plan of the aircraft 100. The one or more processors 204a of the FMS computing device 202a may be configured to perform any of various, suitable operations, which are commonly performed by FMSs, as would be appreciated by those skilled in the art. For example, the FMS computing device 202a may be configured to receive aircraft sensor data (e.g., data associated with aircraft location and orientation, attitude, and/or airspeed data) from the one or more aircraft sensors 218, access flight plan data (e.g., data associated with a current flight plan) maintained within the memory 206a and/or storage 208a, output FMS data based thereon to the one or more HUDs 104a, 104b, the one or more input/output devices 124, the one or more communication subsystems 210, the processing and video generation system computing device 202b, and/or the CAS computing device 202c.

The one or more processors 204a may be configured to generate a three-dimensional flight path from a position and orientation of the aircraft 100 to a waypoint of a flight plan. The one or more processors 204a may be configured to output the generated flight path to the processing and video generation system computing device 202b, the CAS computing device 202c, the one or more HUDs 104a, 104b, and/or a different onboard or off-board computing device.

In some embodiments, the one or more processors 204a may be configured to determine (e.g., by receiving data from the one or more aircraft sensors 218) at least one aircraft state (e.g., position, orientation, and/or detected trajectory) of the aircraft 100 in real time. The one or more processors 204a may be configured to output (e.g., constantly output or frequently output) data associated with the at least one determined aircraft state of the aircraft 100 to the one or more HUDs 104a, 104b, the processing and video generation system computing device 202b, and/or the CAS computing device 202c for use in presenting (e.g., graphically and/or audibly presenting) such information to the pilot or other crew member of the aircraft 100. The one or more processors 204a may be configured to compare (e.g., iteratively compare or constantly compare) the at least one determined aircraft state of the aircraft 100 against a flight plan and/or a generated flight path. By comparing the at least one determined aircraft state of the aircraft 100 against the flight plan and/or generated flight path, the one or more processors 204a may be configured to determine at least one deviation (e.g., a lateral position deviation, a vertical position deviation, an airspeed deviation (e.g., a vertical descent rate deviation, a lateral airspeed deviation), an orientation deviation, or a combination thereof) of the aircraft 100 from the flight plan and/or generated flight path. The one or more processors 204a may be configured to output data associated with the at least one deviation to the processing and video generation system computing device 202b, the one or more HUDs 104a, 104b, the CAS computing device 202c, and/or a different onboard or off-board computing device The processing and video generation system computing device 202b may be configured to receive data from any of various onboard or off-board devices. For example, the processing and video generation system computing device 202b may be configured to receive FMS data (e.g., data associated with a flight plan, at least one determined aircraft state, and/or a generated flight path) and/or alert data (e.g., from the CAS computing device 202c). By way of another example, the processing and video generation system computing device 202b may be configured to exchange (e.g., send and/or receive) data with the one or more HUDs 104a, 104b, the one or more communication subsystems 210, the one or more aircraft sensors 218, the one or more input/output devices 220, and the one or more GPS devices 222.

The processing and video generation system computing device 202b may be configured to process data received from any of various computing devices (e.g., the FMS computing device 202a and/or the CAS computing device 202c) and to output data (e.g., video data and/or audio data) to any of various devices (e.g., the one or more HUDs 104a, 104b and/or the one or more input/output devices 220). For example, the one or more processors 204b of the processing and video generation system computing device 202b may be configured to receive FMS data from the FMS computing device 202a. By way of another example, the one or more processors 204b of the processing and video generation system computing device 202b may be configured to generate graphical data to output to the one or more HUDs 104a, 104b and/or the one or more input/output devices 220 based at least in part on the received data from the FMS computing device 202a.

The one or more processors 204b may be configured to receive the data associated with the at least one determined aircraft state of the aircraft 100 from the FMS system computing device 202a for use in presenting (e.g., graphically and/or audibly presenting) such information to the pilot or other crew member of the aircraft 100. The one or more processors 204b may be configured to receive data associated with the at least one deviation from the FMS computing device 202a and/or a different onboard or off-board computing device. For example, if a deviation exceeds a predetermined threshold deviation, the one or more processors 204b may be configured to generate alert data. By way of another example, the one or more processors 204b may be configured to output one or more signals to one or more controllable grids of a projector of the one or more HUDs 104a, 104b to adjust the brightness and/or the contrast of the one or more HUDs 104a, 104b.

The one or more processors 204b may be configured to receive user feedback data (e.g., data associated with user feedback) such as acknowledgement data (e.g., data associated with a user acknowledging information provided on a HUD 104a, 104b) and/or dismissal data (e.g., data associated with a user dismissing information provided on a HUD 104a, 104b) from an input device (e.g., an input device of the one or more input/output devices 220). In response to receiving the user feedback data, the one or more processors 204b may be configured to cease outputting the one or more signals to one or more controllable grids of the projector of the one or more HUDs 104a, 104b to adjust the brightness and/or the contrast of the one or more HUDs 104a, 104b.

In some embodiments, the processing and video generation system computing device 202b may be configured to perform synthetic vision system (SVS) functionality, for example, by utilizing synthetic image data to construct real-time synthetic views of the environment (e.g., the world outside of the aircraft) based at least on the at least one determined aircraft state relative to the earth. For example, the one or more processors 204b may be configured to perform SVS operations so as to improve a pilot or other crew member's ability to safely fly and/or land the aircraft 100 in a degraded visual environment, such as rain, fog, darkness, smoke, snow, or dust, where the pilot or other crew member might not be able to perceive the surrounding environment without synthetic views.

The CAS computing device 202c may be configured to receive (e.g., collect) data from any suitable onboard and/or off-board device(s) such as the one or more aircraft sensors 218, generate alert data, and output the alert data to the one or more HUDs 104a, 104b or another onboard device for presentation to the pilot or other crew member. For example, the CAS computing device 202c may be implemented as an engine indication and crew alerting system (EICAS) computing device. While the CAS computing device 202c is exemplarily depicted and described as a crew alerting system, some embodiments may include any suitable computing device configured to output alert data to the one or more HUDs 104a, 104b.

Although the present disclosure illustrates the FMS computing device 202a, the processing and video generation computing device 202b, and the CAS computing device 202c of the aircraft 100 as being implemented as separate avionics computing devices, it is noted herein that some or all of the FMS computing device 202a, the processing and video generation computing device 202b, and the CAS computing device 202c may be implemented as a single integrated computing device or as any number of integrated and/or partially integrated computing devices.

In addition, it is noted herein the one or more processors 204a of the FMS computing device 202a may be configured to perform functionality of the processing and video generation system computing device 202b and/or the CAS computing device 202c. For example, the FMS computing device 202a may include an integrated processing and video generation system and CAS, such that the FMS computing device 202a may be programmed to perform functionality of the processing and video generation system computing device 202b and/or the CAS computing device 202c. In this regard, the processing and video generation system computing device 202b and/or the CAS computing device 202c may be optional.

Further, the one or more processors 204b of the processing and video generation system computing device 202b may be configured to perform functionality of the FMS computing device 202a and/or the CAS computing device 202c. For example, the processing and video generation system computing device 202b may include an integrated FMS and CAS, such that processing and video generation system computing device 202b may be programmed to perform functionality of the FMS computing device 202a and/or the CAS computing device 202c. In this regard, a dedicated FMS computing device 202a and/or a dedicated CAS computing device 202c may be optional.

Further, the one or more processors 204c of the CAS computing device 202c may be configured to perform functionality of the FMS computing device 202a and/or the processing and video generation system computing device 202b. For example, the CAS computing device 202c may include an integrated FMS and processing and video generation system, such that CAS computing device 202c may be programmed to perform functionality of the FMS computing device 202a and the processing and video generation system computing device 202b. In this regard, a dedicated FMS computing device 202a and/or a dedicated processing and video generation system computing device 202b may be optional.

Figure 6A:
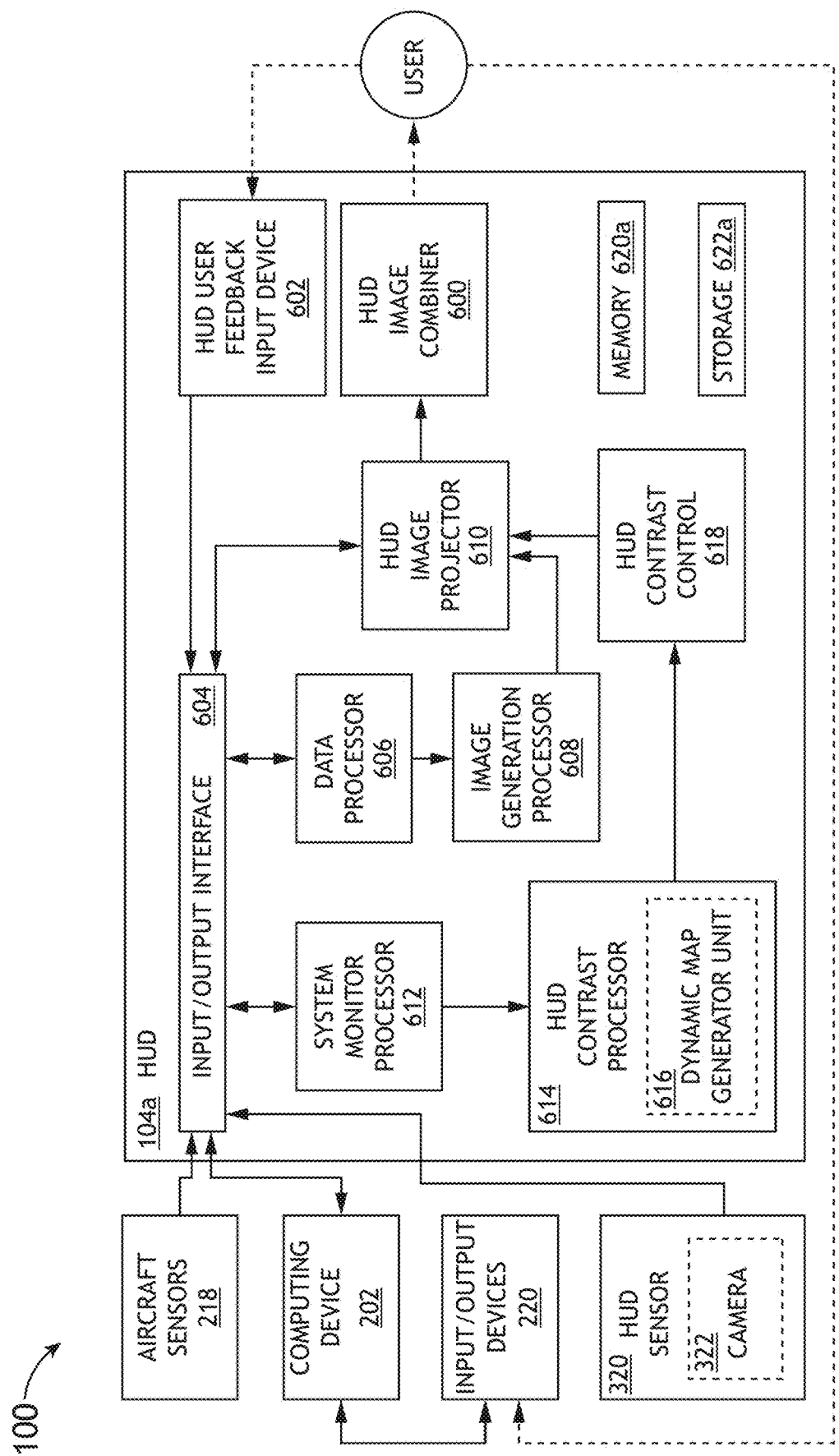
FIG. 6A illustrates an exemplary embodiment of an aircraft including a high dynamic range head-up display according to the inventive concepts disclosed herein.
Figure 6B:
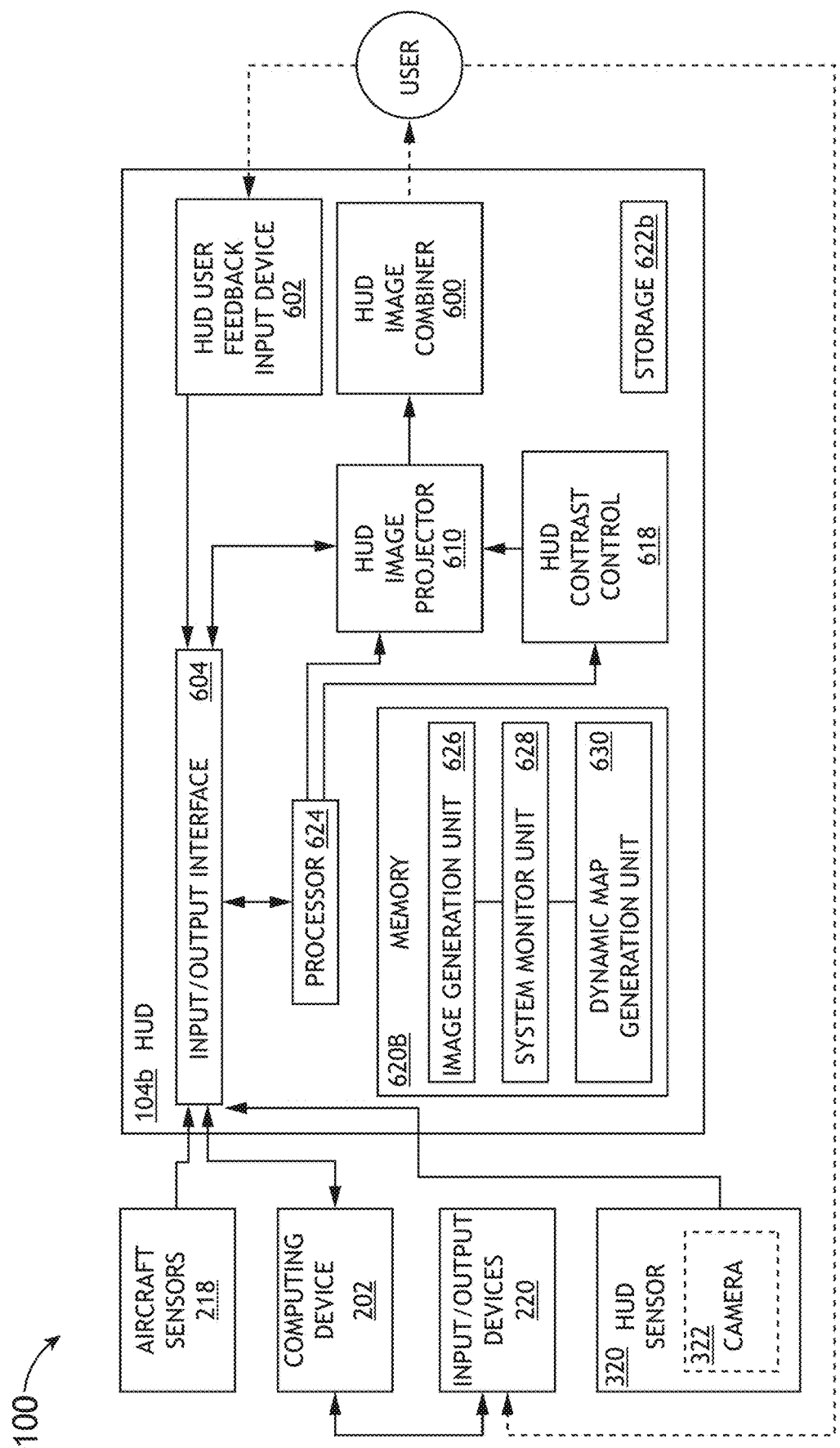
FIG. 6B illustrates an exemplary embodiment of an aircraft including a high dynamic range head-up display according to the inventive concepts disclosed herein.

FIGS. 6A and 6B generally illustrate an embodiment of the aircraft 100 including the high dynamic range head-up displays 104a, 104b according to the inventive concepts disclosed herein.

The one or more high dynamic range (HDR) head-up displays (HUDs) 104a, 104b may be configured to provide aircraft level caution and warning indication, HUD level caution and warning, and any indications that require a pilot or other crew member to take immediate action. The one or more HUDs 104a, 104b may be able to receive acknowledgement from a pilot or other crew member and can electronically forward that acknowledgement to another aircraft device and/or system. For example, the one or more HUDs 104a, 104b may be communicatively coupled to one or more computing devices 202 (e.g., the FMS computing device 202a, the processing and video generation system computing device 202b, and/or the CAS computing device 202c, as illustrated in FIG. 5) the one or more aircraft sensors 218, the one or more input/output devices 220, and/or the one or more HUD sensors 320 (e.g., the one or more cameras 322).

The one or more HUDs 104a, 104b may be configured to perform operations to graphically present information (e.g., information conformal to the real world and associated with attitude, airspeed, heading, flight path, and approach path guidance, information in regard to alerts or warnings displayed by the one or more HUDs combiners related to a particular phase of flight, or the like) by displaying symbology (e.g., text, symbols, and/or graphics) to a user (e.g., a pilot or other crew member) via one or more HUD image combiners 600 based on data received from the one or more computing devices 202, the one or more aircraft sensors 218, and the one or more HUD sensors 320 (e.g., the one or more cameras 322).

It is noted herein the symbology may include, but is not limited to, symbology for any vehicle (e.g., the aircraft 100) in any mode of operation known in the art. For example, the symbology may include, but is not limited to, information associated with attitude, airspeed, heading, flight path, and approach path guidance in the form of displayed text, symbols, and/or graphics. By way of another example, the symbology may include, but is not limited to, information received, acquired, generated, and/or stored via any component of the aircraft 100 (e.g., the one or more computing devices 202, the one or more communication subsystems 210, the one or more aircraft sensors 218, the one or more input/output devices 220, the one or more GPS devices 222, or the like).

The one or more HUDs 104a, 104b may be configured to receive feedback from a user via one or more HUD user feedback input devices 602 and be configured to electronically forward such user feedback to another vehicle device and/or system.

As illustrated in FIG. 6A, the one or more HUDs 104a may include one or more input/output interfaces 604, one or more processors (e.g., one or more system monitor processors 612, one or more data processors 606, and/or one or more image generation processors 608, one or more HUD contrast processors 614 including a dynamic map generator unit 616, or the like), one or more HUD image projectors 610, one or more HUD controls 618, and one or more non-transitory computer readable medium (e.g., memory 620a and storage 622), as well as any suitable components typically included in HUDs, some or all of which may be communicatively coupled.

A user (e.g., a pilot or other crew member) may interface with one or more of the one or more input/output devices 220 (e.g., cockpit instrumentation and controls), some or all of which may be communicatively coupled to the one or more computing devices 202, to control information to be displayed on the one or more HUD image combiners 600 of the one or more HUDs 104a. The user may interface with the HUD user feedback input device 602 to instruct the one or more HUDs 104a to display or cease displaying particular information on the one or more HUD image combiners 600.

The one or more input/output interfaces 604 may act as input/output subsystem configured to interconnect an input/output system of data links from the one or more aircraft sensors 218 and the one or more computing devices 202 (as well any other devices of the aircraft 100) with electronic components of the one or more HUDs 104a. For example, the one or more input/output interfaces 604 may include or be implemented as at least one data port and/or at least one data bus.

The one or more data processors 606 may be configured to receive and process input data (e.g., aircraft sensor data and/or computing device data received via the one or more input/output interfaces 604 from the one or more aircraft sensors 218 and/or one or more of the one or more computing devices 202) and output data (e.g., image generation instructions) necessary for the image generator processors 608 to generate pixelated images.

The image generation processors 608 may be configured to generate a stream of image data (e.g., associated with pixelated images) based at least on the data received from the one or more data processors 606. The image generation processors 608 may be configured to output the generated image data to the one or more HUD image projectors 610.

The one or more HUD image projectors 610 may be configured to receive the generated image data from the image generation processors 608 and project a stream of images onto or through the one or more HUD image combiners 600 to be displayed to the pilot or other crew member (e.g., at optical infinity). The one or more HUD image combiners 600 may be implemented as overhead refractive combiners or waveguide combiners. For example, if the one or more HUD image combiners 600 are implemented as an overhead refractive combiner, the one or more HUD image projectors 610 may be configured to project a stream of images one or more of onto or through the one or more HUD image combiners 600 to be displayed to the pilot or other crew member. By way of another example, if the one or more HUD image combiners 600 are implemented as a waveguide combiner, the one or more HUD image projectors 610 may be configured to project a stream of images through waveguides in the one or more HUD image combiners 600 such that the one or more HUD image combiners 600 displays the stream of images as collimated images to the pilot or other crew member. The one or more HUD image projectors 610 may include light-emitting diode (LED) projectors, cathode-ray tube projectors, or the like.

The one or more HUD image combiners 600 may be configured to display the projected stream of images to the user (e.g., the pilot or other crew member). The one or more HUD image combiners 600 may be at least partially transparent such that the pilot or other crew member is able to view the displayed stream of images while viewing an environment (e.g., outside of the aircraft 100) through the one or more HUD image combiners 600.

Although the present disclosure is directed to the one or more HUD image projectors 610 and the one or more HUD image combiners 600 being separate components of the HUD 104a, it is noted herein the one or more HUD image projectors 610 and the one or more HUD image combiners 600 may be implemented in the HUD 104a as a single integrated component.

The one or more system monitor processors 612 may be configured to monitor health and performance of individual components, as well as the overall system, of the one or more HUDs 104a. The one or more system monitor processors 612 may be configured to receive and process input data (e.g., aircraft sensor data, computing device data, HUD sensor data, and/or HUD user feedback device data) received via the one or more input/output interfaces 604 from the one or more aircraft sensors 218, one or more of the one or more computing devices 202, the one or more HUD sensors 320, and/or the HUD user feedback device 602. The one or more system monitor processors 612 may be configured to output data (e.g., instructions to adjust the brightness and/or the contrast to improve (e.g., optimize and/or make uniform) the average contrast ratio of the one or more HUDs 104) necessary for the one or more HUD contrast processors 614 to generate a dynamic map via the dynamic map generator unit 616. The one or more system monitor processors 612 may be configured to output data (e.g., instructions to adjust the brightness and/or the contrast to improve (e.g., optimize and/or make uniform) the average contrast ratio of the one or more HUDs 104) necessary for the one or more HUD contrast processors 614 to output signals to, control, and/or operate the one or more HUD controls 618.

The one or more HUD contrast processors 614 may be configured to generate a dynamic map via the dynamic map generator unit 616 and output signals (e.g., control signal for the one or more HUD controls 618 including controls for brightness and/or contrast) necessary for the one or more HUD contrast processors 614 to control and/or operate the one or more HUD controls 618. The one or more HUD contrast processors 614 may be configured to output signals to, control, and/or operate the one or more HUD controls 618.

The one or more HUD controls 618 may include or be implemented as any suitable control for the brightness setting and/or the contrast setting of the one or more HUDs 104a in proximity to the one or more HUD image combiners 600. The one or more HUD contrast processors 614 may be configured to control the contrast ratio of the HUD 104a. The one or more HUD contrast processors 614 may generate a dynamic map of the real-world luminance over the field of view (FOV) of the HUD 104a via the dynamic map generator unit 616.

Figure 7A:
FIG. 7A illustrates an image of a real-world view acquired via one or more head-up display sensors according to the inventive concepts disclosed herein.

FIG. 7A illustrates an image 700 of a real-world view including one or more areas 702 according to the inventive concepts herein. The real-world view may be acquired by the one or more HUD sensors 320 as one or more images. The real-world view may be at least partially representative of the field of view as viewed by a pilot or other crew member. For example, the one or more HUD sensors 320 (e.g., the one or more cameras 322) may be positioned proximate to one or more the HUD image combiners 600 and configured to acquire the one or more images of the FOV through a windshield of a vehicle (e.g., the windshield 108 of the cockpit 102 of the aircraft 100). By way of another example, the one or more HUD sensors 320 (e.g., the one or more cameras 322) may be positioned proximate to one or more the HUD image combiners 600 and configured to acquire the one or more images of the FOV through a windshield of a vehicle (e.g., the windshield 108 of the cockpit 102 of the aircraft 100) and the one or more HUD image combiners 600. The real-world view may be at least partially representative of an environmental vision system. For example, the one or more HUD sensors 320 (e.g., the one or more cameras 322) may be located within a nosecone of a vehicle (e.g., the nosecone 110 of the aircraft 100). The one or more system monitor processors 612 and/or the one or more HUD contrast processors 614 may receive the one or more images acquired by the one or more HUD sensors 320 and define the one or more areas 702 within the image 700.

Figure 7B:
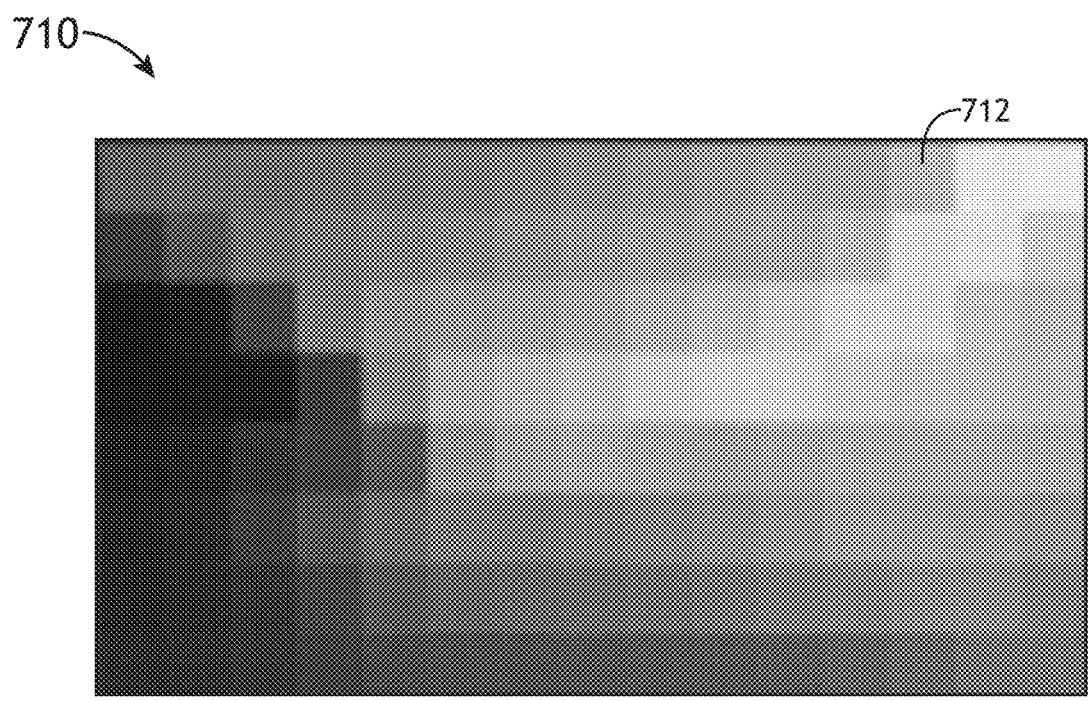
FIG. 7B illustrates an image of a dynamic map generated based on an image of a real-world view acquired via one or more head-up display sensors according to the inventive concepts disclosed herein.

FIG. 7B illustrates an image 710 of a generated grid of a dynamic luminance map including one or more controllable cells 712 according to the inventive concepts herein. The one or more HUD contrast processors 614 may generate the grid of the dynamic luminance map (e.g., of a backlight of the HUD 104a), where the grid includes the one or more controllable cells 712 (e.g., spatially matrixed zones), via one or more dynamic mapping algorithms utilized by the dynamic map generator unit 616. For example, a controllable cell 712 may include a single pixel, multiple pixels, or all pixels of the HUD 104a. For instance, each controllable cell 712 may map to a corresponding area 702 of the image 700. By way of another example, the one or more cells 712 may be individually controllable. It is noted herein, however, that some or all of the one or more cells 712 may be globally controllable The one or more HUD contrast processors 614 may generate one or more control signals based on the grid including the one or more cells 712 and provide the one or more control signals to the one or more HUD controls 618. For example, the one or more control signals may increase the brightness of a cell 712 with a higher background luminance (e.g., has a light background). By way of another example, the one or more control signals may decrease or reduce the brightness of a cell 712 with a lower background luminance (e.g., has a darker background). The one or more control signals may be utilized by the one or more HUD controls 618 to adjust the brightness and/or the contrast of the one or more HUD image projectors 610. As such, the HUD 104a may be provided with a greatly improved (e.g., optimized and/or uniform) average contrast ratio over other HUDs known in the art. In this regard, a safer HUD system may be generated by reducing or eliminating the possibility of a situation where the contrast between the symbology displayed on the HUD and the brightness of the real world is insufficient to resolve a difference in brightness across the FOV.

The HUD user feedback input device 602 may be configured to receive user inputs (e.g., feedback) from the user. For example, in response to an adjustment of the contrast of the one or more HUDs 104a by the one or more HUD controls 618, the user may interface with the HUD user feedback input device 602 so as to acknowledge or dismiss the adjustment (e.g., following a prompt to accept or reject the adjustment). By way of another example, in response to an adjustment of the contrast of the one or more HUDs 104a by the one or more HUD controls 618, the user may interface with the HUD user feedback input device 602 to make one or more additional manual adjustments to the contrast of the one or more HUDs 104a.

The HUD user feedback input device 602 may be configured to detect the user's feedback (e.g., acknowledgement of or dismissal of) associated with the adjustment of the brightness and/or the contrast of the one or more HUDs 104a by the one or more HUD controls 618. Upon detecting the user's feedback, the HUD user feedback input device 602 may be configured to output user feedback data associated with the user's feedback to at least one processor (e.g., the one or more system monitor processors 612 and/or the one or more data processors 606). Upon receiving the user feedback data, the at least one processor may be configured to execute instructions for further adjusting the contrast of the one or more HUDs 104a via the one or more HUD controls 618. For example, if a particular HUD control 618 adjusts the brightness and/or the contrast of the one or more HUDs 104a, the user may choose to reject the adjustment by interfacing with the HUD user feedback input device 602, which causes data to be sent to at least one processor of the one or more HUDs 104a that in turn may cause the particular HUD control 618 to reset the contrast of the one or more HUDs 104a to the pre-adjusted contrast level. By way of another example, if a particular HUD control 618 adjusts the brightness and/or the contrast of the one or more HUDs 104a, the user may choose to make one or more additional adjustments by interfacing with the HUD user feedback input device 602, which causes data to be sent to at least one processor of the one or more HUDs 104a that in turn may cause the particular HUD control 618 to further adjust the brightness and/or the contrast of the one or more HUDs 104a.

The HUD user feedback input device 602 may include or be implemented as a physical button (e.g., a dedicated physical button or a particular HUD contrast control 618 implemented as a physical button), soft button displayed on a touchscreen display (e.g., a dedicated touchscreen display or a particular HUD contrast control 618 implemented as a touchscreen display), at least one touch-sensitive sensor (e.g., a capacitive sensor, a resistive sensor, a sensor, or a particular HUD control 618 implemented as a touch-sensitive illuminator, a microphone (e.g., which may include elements similar to and function similar to the microphone 318 as illustrated in FIG. 3) of a voice recognition system (e.g., which may include the microphone, a processor, and memory), a sensor (e.g., an optical sensor or a camera) of an eye tracking subsystem (e.g., which may include elements similar to and function similar to the eye tracking subsystem 304 as illustrated in FIG. 3), a sensor of a gesture recognition system (e.g., which may include the sensor, a processor, and memory), or a combination thereof. For example, the HUD user feedback input device 602 may be configured to detect user feedback as a button press, hand gesture, eye movement, voice command, a touch, or the like.

Although the present disclosure is directed to the HUD user feedback input device 602 and the one or more HUD controls 618 as being distinct elements, it is noted herein that the HUD user feedback input device 602 and a particular HUD contrast control 618 may be integrated in the same device. For example, a particular HUD contrast control 618 may include the HUD user feedback input device 602 (e.g., the particular HUD contrast control 618 implemented as a physical button illuminator indicator configured to present information and provide user feedback or the particular HUD control 618 implemented as a touchscreen display configured to present information and provide user feedback). Therefore, the above description should not be interpreted as a limitation on the present disclosure but merely an illustration.

Although the present disclosure is directed to the one or more data processors 606, the image generation processors 608, the one or more system monitor processors 612, and the one or more HUD contrast processors 614 as being distinct processors, it is noted herein that some or all of the one or more data processors 606, the image generation processors 608, the one or more system monitor processors 612, and/or the one or more HUD contrast processors 614 may be implemented on a single processor or across any number of distributed processors. For example, the one or more data processors 606 and the one or more system monitor processors 612 may be implemented as or on a single processor. For instance, the single processor may include multiple cores such that a first core is configured to perform the functionality of the one or more data processors 606 and a second core is configured to perform the functionality of the one or more system monitor processors 612. By way of another example, the image generation processors 608 and the one or more HUD contrast processors 614 may be implemented as or on a single processor. By way of another example, one or more of the one or more data processors 606, the image generation processors 608, the one or more system monitor processors 612, and the one or more HUD contrast processors 614 may be implemented as or on any number and any types of processors. Therefore, the above description should not be interpreted as a limitation on the present disclosure but merely an illustration.

As illustrated in FIG. 6B, the one or more HUDs 104b may include elements similar to and function similar to HUD 104a as illustrated in FIG. 6A such as the one or more HUD image combiners 600, the one or more HUD user feedback input devices 602, the one or more input/output interfaces 604, the one or more HUD image projectors 610, and/or the one or more HUD controls 618.

The one or more HUDs 104b may include one or more processors 624 configured to (e.g., programmed to) to perform the functionality of the one or more data processors 606, and the one or more image generation processors 608, the one or more system monitor processors 612, and/or the one or more HUD contrast processors 614 of the one or more HUDs 104a as illustrated in FIG. 6A. For example, the one or more processors 624 may execute instructions of units or software modules maintained (e.g., stored) in at least one non-transitory computer-readable medium (e.g., memory 620b and/or storage 622b). For instance, execution of an image generation unit or software module 626 by the one or more processors 624 may cause the one or more processors 624 to function similarly to the image generation processors 608 as illustrated in FIG. 6A. In addition, execution of a system monitor unit or software module 628 by the one or more processors 624 may cause the one or more processors 624 to function similarly to the one or more system monitor processors 612 as illustrated in FIG. 6A. Further, execution of a dynamic map generation unit or software module 630 may cause the one or more processors 624 to function similarly to the one or more HUD contrast processors 614 including the dynamic map generator unit 616 as illustrated in FIG. 6A.

Although the present disclosure is directed to the one or more HUDs 104a including the one or more data processors 606, and the one or more image generation processors 608, the one or more system monitor processors 612, and/or the one or more HUD contrast processors 614, it is noted herein that the one or more HUDs 104a may include the one or more processors 624. In addition, although the present disclosure is directed to the one or more HUDs 104b including the one or more processors 624, it is noted herein that the one or more HUDs 104b may include the one or more data processors 606, and the one or more image generation processors 608, the one or more system monitor processors 612, and/or the one or more HUD contrast processors 614. Therefore, the above description should not be interpreted as a limitation on the present disclosure but merely an illustration.

Figure 8:
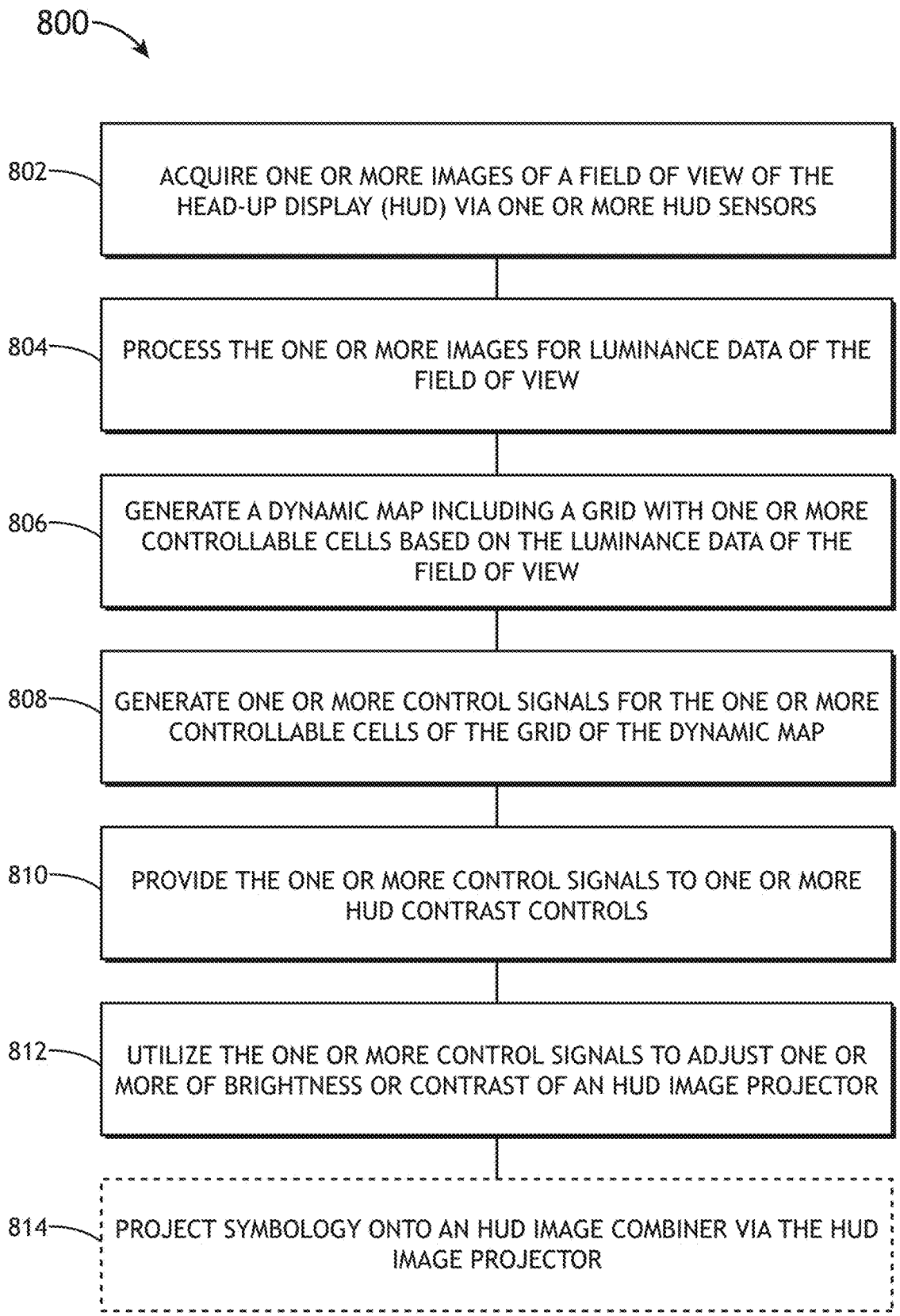
FIG. 8 illustrates a flowchart of an exemplary method for operation of a high dynamic range head-up display according to the inventive concepts disclosed herein.
Figure 9:
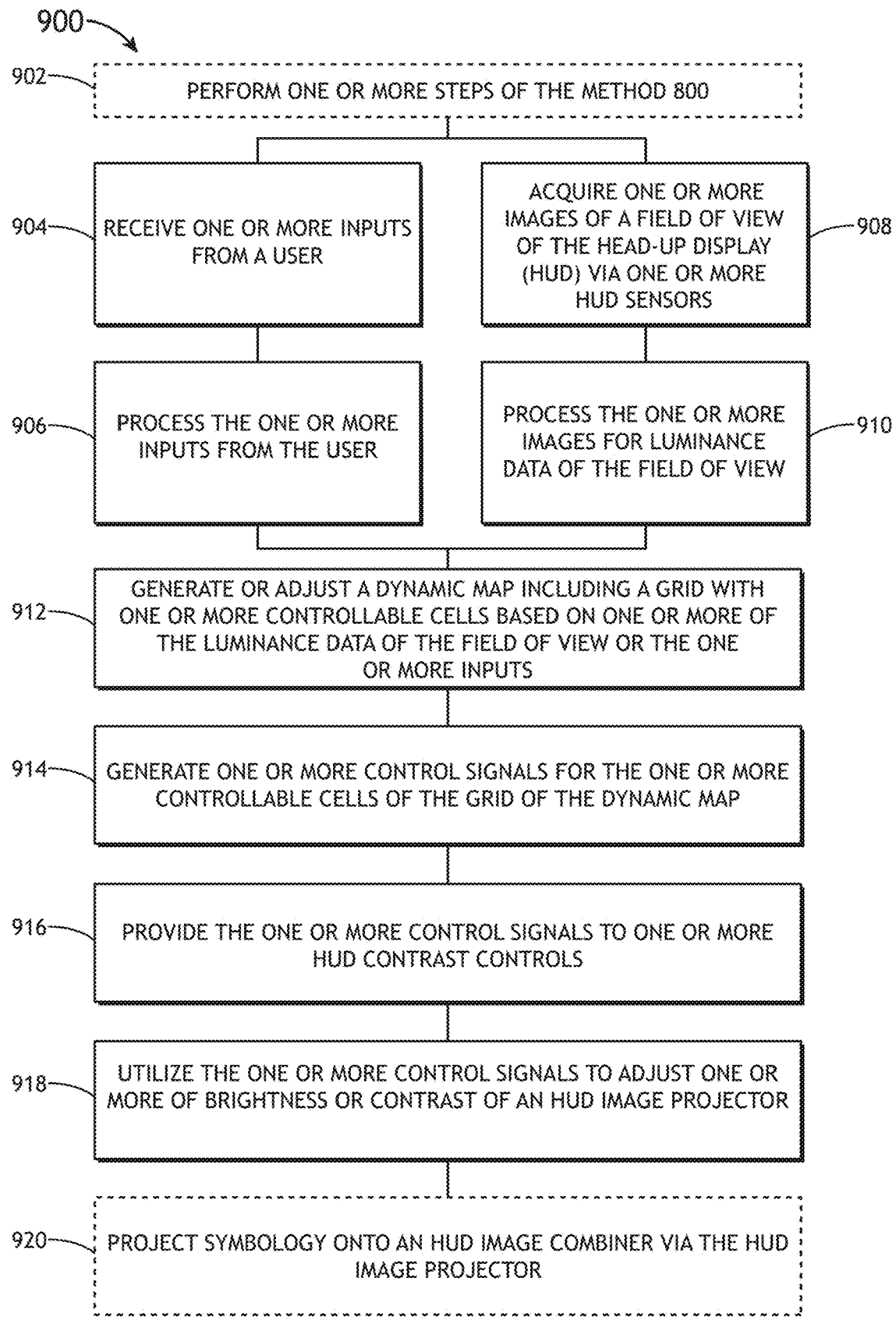
FIG. 9 is a flowchart of an exemplary method for operation of a high dynamic range head-up display according to the inventive concepts disclosed herein.

FIGS. 8 and 9 generally illustrate methods for operation of a high dynamic range head-up display, in accordance with the inventive concepts herein.

FIG. 8 illustrates a method 800 for operation of a high dynamic range head-up display according to the inventive concepts disclosed herein. In one example, the method 800 may be implemented by the aircraft 100 including the one or more HUDs 104a, 104b.

A step 802 may include acquiring one or more images of a field of view of the head-up display (HUD) via one or more HUD sensors. For example, the one or more images acquired via the one or more HUD sensors 320 may include the field of view as viewed through the one or more image combiners 600. By way of another example, the one or more images acquired via the one or more HUD sensors 320 may include the field of view unimpeded/not affected by the one or more image combiners 600.

A step 804 may include processing the one or more images for luminance data of the field of view. The one or more system monitor processors 612, the one or more HUD contrast processors 614, and/or the one or more processors 624 may receive the one or more images acquired by the one or more HUD sensors 320 and define the one or more areas (e.g., areas 702, as illustrated in FIG. 7A) within the one or more images.

A step 806 may include generating a dynamic map including a grid with one or more controllable cells based on the luminance data of the field of view. The one or more HUD contrast processors 614 and/or the one or more processors 624 may generate the grid of the dynamic luminance map (e.g., of a backlight of the HUD 104a, 104b), where the grid includes the one or more controllable cells 712 (e.g., spatially matrixed zones), via one or more dynamic mapping algorithms utilized by the dynamic map generator unit 616 and/or the dynamic map generation unit or software module 630, respectively.

A step 808 may include generating one or more control signals for the one or more controllable cells of the grid of the dynamic map. The one or more HUD contrast processors 614 and/or the one or more processors 624 may generate one or more control signals based on the grid including the one or more cells 712.

A step 810 may include providing the one or more control signals to one or more HUD controls. The one or more HUD contrast processors 614 and/or the one or more processors 624 may provide the one or more control signals to the one or more HUD controls 618.

A step 812 may include utilizing the one or more control signals to adjust one or more of brightness or contrast of a HUD image projector to improve (e.g., optimize and/or make uniform) average contrast ratio. The one or more control signals may be utilized by the one or more HUD controls 618 to adjust the brightness and/or the contrast of the one or more HUD image projectors 610 of the HUD 104a, 104b.

It is noted herein that some or all of method 800 (e.g., including, but not limited to, steps 808, 810, and 812) may be considered configuring an average contrast ratio of a HUD image projector based on a generated dynamic map, for purposes of the present disclosure.

An optional step 814 may include projecting symbology onto a HUD image combiner via the HUD image projector. For example, the symbology may be projected onto the one or more HUD image combiners 600 prior to the acquiring of the one or more images of the HUD field of view via the one or more HUD sensors 320. By way of another example, the symbology may be projected onto the one or more HUD image combiners 600 during the acquiring of the one or more images of the HUD field of view via the one or more HUD sensors 320. By way of another example, the symbology may be projected onto the one or more HUD image combiners 600 after utilizing the one or more control signals to adjust brightness and/or contrast of the one or more HUD image projectors 610 to improve (e.g., optimize and/or make uniform) average contrast ratio.

FIG. 9 illustrates a method 900 for operation of a high dynamic range head-up display according to the inventive concepts disclosed herein. In one example, the method 900 may be implemented by the aircraft 100 including the one or more HUDs 104a, 104b.

An optional step 902 may include performing one or more steps of the method 800.

A step 904 may include receiving one or more inputs from a user. For example, the one or more inputs may be received from a pilot or other crew member via the one or more HUD user input feedback input devices 602. For instance, the one or more inputs may be received following the performing of some or all of the steps of the method 800. It is noted herein that the one or more inputs may be received prior to performing any of the steps of the method 800 (e.g., during a calibration phase), such that step 902 is not integral or required to the completion of method 900.

A step 906 may include processing the one or more inputs. The one or more system monitor processors 612, the one or more HUD contrast processors 614, and/or the one or more processors 624 may receive the one or more inputs and process the one or more inputs for one or more commands from the user (e.g., commands which may effect a manual adjustment of the one or more HUD image projectors 610).

A step 908 may include acquiring one or more images of a field of view of the HUD via one or more HUD sensors. For example, the one or more images acquired via the one or more HUD sensors 320 may include the field of view as viewed through the one or more image combiners 600. By way of another example, the one or more images acquired via the one or more HUD sensors 320 may include the field of view unimpeded/not affected by the one or more image combiners 600.

A step 910 may include processing the one or more images for luminance data of the field of view. The one or more system monitor processors 612, the one or more HUD contrast processors 614, and/or the one or more processors 624 may receive the one or more images acquired by the one or more HUD sensors 320 and define the one or more areas (e.g., areas 702, as illustrated in FIG. 7A) within the one or more images.

It is noted herein that steps 904/906 and steps 908/910 may be performed as simultaneous sets (e.g., a set of steps 904/906 and a set of steps 908/910). It is noted herein, however, that one set of steps may be performed before the other set of steps and/or separate from the other set of steps. For example, the set of steps 908/910 may be performed prior to the set of steps 904/906. By way of another example, the set of steps 908/910 may be performed without the set of steps 904/906. By way of another example, the sets of steps 904/906 may be performed without the set of steps 908/910.

A step 912 may adjusting or generating a dynamic map including a grid with one or more controllable cells based on one or more of the luminance data of the field of view or the one or more inputs. The one or more HUD contrast processors 614 and/or the one or more processors 624 may generate the grid of the dynamic luminance map (e.g., of a backlight of the HUD 104a, 104b), where the grid includes the one or more controllable cells 712 (e.g., spatially matrixed zones), via one or more dynamic mapping algorithms utilized by the dynamic map generator unit 616 and/or the dynamic map generation unit or software module 630, respectively.

A step 914 may include generating one or more control signals for the one or more controllable cells of the grid of the dynamic map. For example, the one or more HUD contrast processors 614 and/or the one or more processors 624 may generate one or more control signals based on the grid including the one or more cells 712. By way of another example, the one or more system monitor processors 612, the one or more HUD contrast processors 614, and/or the one or more processors 624 may generate one or more control signals based on the one or more inputs. For instance, where the one or more inputs include a rejection of a previous adjustment effected by the performing of some or all of method 800 via the one or more inputs, the one or more brightness and/or contrast control adjustments may be reset such that the one or more HUD image projectors 610 project the average contrast ratio utilized prior to the performing of some or all of method 800. In addition, where the one or more inputs include a request for additional adjustments (e.g., manual adjustments), the one or more brightness and/or contrast control adjustments may be effected such that the one or more HUD image projectors 610 may be manually adjusted beyond the adjustments effected by the one or more control signals responsive to the dynamic map.

A step 916 may include providing the one or more control signals to one or more HUD controls. The one or more HUD contrast processors 614 and/or the one or more processors 624 may provide the one or more control signals to the one or more HUD controls 618.

A step 918 may include utilizing the one or more control signals to adjust brightness and/or contrast of a HUD image projector to improve (e.g., optimize and/or make uniform) average contrast ratio. The one or more control signals may be utilized by the one or more HUD controls 618 to adjust the brightness and/or the contrast of the one or more HUD image projectors 610 of the HUD 104a, 104b.

It is noted herein that some or all of method 900 (e.g., including, but not limited to, steps 914, 916, 918) may be considered configuring an average contrast ratio of a HUD image projector based on a generated dynamic map, for purposes of the present disclosure.

An optional step 920 may include projecting symbology onto a HUD image combiner via the HUD image projector. For example, the symbology may be projected onto the one or more HUD image combiners 600 prior to the acquiring of the one or more images of the HUD field of view via the one or more HUD sensors 320. By way of another example, the symbology may be projected onto the one or more HUD image combiners 600 during the acquiring of the one or more images of the HUD field of view via the one or more HUD sensors 320. By way of another example, the symbology may be projected onto the one or more HUD image combiners 600 after utilizing the one or more control signals to adjust brightness and/or contrast of the one or more HUD image projectors 610 to improve (e.g., optimize and/or make uniform) average contrast ratio.

It is noted herein the methods 800 and 900 are not limited to the steps provided. For example, the methods 800 and 900 may instead include more or fewer steps. By way of another example, the methods 800 and 900 may perform the steps in an order other than provided. Therefore, the above description should not be interpreted as a limitation on the scope of the present disclosure, but merely an illustration.

As will be appreciated from the above embodiments, the inventive concepts disclosed herein are directed to a high dynamic range head-up display configured to provide a uniform contrast to a viewer by sensing real-world brightness and manipulating backlight brightness over a grid of independently controlled cells.

It is to be understood that embodiments of the methods in accordance with the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A high dynamic range head-up display (HUD), comprising:

a HUD image combiner positioned proximate to a windshield of a vehicle and configured to present HUD symbology to a user;

a HUD image projector configured to project the HUD symbology at least one of onto or through the HUD image combiner, the HUD image projector including a plurality of pixels, the HUD symbology being formed at least one of onto or through the HUD image combiner via a projection of at least one lit pixel of the plurality of pixels of the HUD image projector;

at least one HUD sensor configured to acquire one or more images of an entire field of view (FOV) through both the HUD image combiner and the windshield of the vehicle; and at least one processor communicatively coupled to one or more of the at least one HUD sensor or the HUD image projector, the at least one processor configured to:

process the one or more images for real-world luminance data over the entire FOV;

generate a dynamic map over the entire FOV of the HUD image projector, the dynamic map comprising a grid with one or more controllable cells based on the real-world luminance data over the entire FOV, each of the one or more controllable cells representing a subset of pixels of the plurality of pixels, each of the one or more controllable cells mapping to an area of the one or more images, each of the one or more controllable cells including a background luminance corresponding to the mapped area of the one or more images;

configure an average contrast ratio of the HUD image projector based on the dynamic map; and configure the HUD image projector to optimize the average contrast ratio based on the generated dynamic map by adjusting at least one backlight brightness of a subset of pixels of the plurality of pixels represented by a respective controllable cell of the one or more controllable cells based on the background luminance corresponding to the mapped area of the one or more images.

2. The HUD of claim 1, the at least one processor further configured to:

generate one or more control signals for the one or more controllable cells of the grid of the dynamic map;

provide the one or more control signals to one or more HUD controls, the one or more HUD controls communicatively coupled to the at least one processor; and utilize the one or more control signals to adjust at least one of a brightness or a contrast of the HUD image projector to improve the average contrast ratio of the HUD image projector.

3. The HUD of claim 1, the at least one processor further configured to:

process one or more additional images for additional real-world luminance data over the entire FOV;

adjust the dynamic map over the entire FOV of the HUD image projector, the dynamic map comprising the grid with the one or more controllable cells based on the processed one or more additional images, each of the one or more controllable cells mapping to an area of the one or more images, each of the one or more controllable cells including an additional background luminance corresponding to the mapped area of the one or more images;

reconfiguring the average contrast ratio based on the adjusted dynamic map;

and configure the HUD image projector to optimize the reconfigured average contrast ratio based on the adjusted dynamic map by adjusting at least one backlight brightness of a subset of pixels of the plurality of pixels represented by a respective controllable cell of the one or more controllable cells based on the additional background luminance corresponding to the mapped area of the one or more images.

4. The HUD of claim 3, the at least one processor further configured to:
generate one or more control signals for the one or more controllable cells of the grid of the adjusted dynamic map;
provide the one or more control signals to one or more HUD controls, the one or more HUD controls communicatively coupled to the at least one processor; and
utilize the one or more control signals to adjust at least one of a brightness or a contrast of the HUD image projector to improve the average contrast ratio of the HUD image projector.

5. The HUD of claim 1, further comprising:
at least one user feedback input device configured to receive one or more user inputs, the user feedback input device communicatively coupled to the at least one processor;
the at least one processor further configured to:
generate one or more control signals for the one or more controllable cells of the grid of the adjusted dynamic map based on the one or more inputs;
provide the one or more control signals to one or more HUD controls, the one or more HUD controls communicatively coupled to the at least one processor; and
utilize the one or more control signals to adjust at least one of a brightness or a contrast of the HUD image projector to improve the average contrast ratio of the HUD image projector.

6. The HUD of claim 1, the at least one HUD sensor comprising at least one forward-facing camera.

7. The HUD of claim 1, one or more of the HUD image combiner, the HUD image projector, the at least one HUD sensor, or the at least one processor being coupled to the vehicle.

8. The HUD of claim 7, the at least one HUD sensor being one of a plurality of HUD sensors, the HUD comprising:
an additional HUD sensor of the plurality of HUD sensors being located within a nosecone of the vehicle.

9. The HUD of claim 1, the one or more controllable cells including a plurality of controllable cells, a first controllable cell of the plurality of controllable cells including a background luminance that is higher than a background luminance of a second controllable cell of the plurality of controllable cells, the at least one processor configured to:
configure the HUD image projector to optimize the average contrast ratio based on the generated dynamic map by increasing the at least one backlight brightness of a subset of pixels of the plurality of pixels represented by the first controllable cell of the plurality of controllable cells based on the higher background luminance corresponding to the mapped area of the one or more images.

10. The HUD of claim 1, the one or more controllable cells including a plurality of controllable cells, a first controllable cell of the plurality of controllable cells including a background luminance that is lower than a background luminance of a second controllable cell of the plurality of controllable cells, the at least one processor configured to:
configure the HUD image projector to optimize the average contrast ratio based on the generated dynamic map by decreasing the at least one backlight brightness of a subset of pixels of the plurality of pixels represented by the first controllable cell of the plurality of controllable cells based on the lower background luminance corresponding to the mapped area of the one or more images.

11. A method for operating a head-up display (HUD), comprising:
acquiring one or more images of an entire field of view (FOV) via at least one HUD sensor through both an HUD image combiner and a windshield of a vehicle;
processing the one or more images for real world luminance data over the entire FOV via at least one processor;
generating, via the at least one processor, a dynamic map over the entire FOV of an HUD image projector, the HUD image projector including a plurality of pixels, the dynamic map comprising a grid with one or more controllable cells based on the real-world luminance data over the entire FOV, each of the one or more controllable cells representing a subset of pixels of a plurality of pixels, each of the one or more controllable cells mapping to an area of the one or more images, each of the one or more controllable cells including a background luminance corresponding to the mapped area of the one or more images;
configuring, via the at least one processor, an average contrast ratio of the HUD image projector based on the dynamic map; and
configuring a HUD image projector to optimize the average contrast ratio based on the generated dynamic map by adjusting at least one backlight brightness of a subset of pixels of the plurality of pixels represented by a respective controllable cell of the one or more controllable cells based on the background luminance corresponding to the mapped area of the one or more images.

12. The method of claim 11, further comprising:
projecting HUD symbology at least one of onto or through the HUD image combiner via the HUD image projector, the HUD image combiner being positioned proximate to the windshield of the vehicle, the HUD symbology being formed at least one of onto or through the HUD image combiner via a projection of at least one lit pixel of the plurality of pixels of the HUD image projector.

13. The method of claim 11, further comprising:
generating one or more control signals for the one or more controllable cells of the grid of the dynamic map;
providing the one or more control signals to one or more HUD controls, the one or more HUD controls communicatively coupled to the at least one processor; and
utilizing the one or more control signals to adjust at least one of a brightness or a contrast of the HUD image projector to improve the average contrast ratio of the HUD image projector.

14. The method of claim 11, further comprising:
processing one or more additional images for additional real-world luminance data over the entire FOV;
adjusting the dynamic map comprising the grid with the one or more controllable cells based on the processed one or more additional images, each of the one or more controllable cells mapping to an area of the plurality of areas from the additional real-world luminance data over the entire FOV, each of the one or more controllable cells including an additional background luminance corresponding to the mapped area of the one or more additional images;

reconfiguring the average contrast ratio based on the adjusted dynamic map; and configuring the HUD image projector to optimize the reconfigured average contrast radio based on the adjusted dynamic map by adjusting at least one backlight brightness of a subset of pixels of the plurality of pixels represented by a respective controllable cell of the one or more controllable cells based on the additional background luminance corresponding to the mapped area of the one or more additional images.

15. The method of claim 14, further comprising:

generating one or more control signals for the one or more controllable cells of the grid of the adjusted dynamic map;

providing the one or more control signals to one or more HUD controls, the one or more HUD controls communicatively coupled to the at least one processor; and utilizing the one or more control signals to adjust at least one of a brightness or a contrast of the HUD image projector to improve the average contrast ratio of the HUD image projector.

16. The method of claim 11, further comprising:

receiving one or more inputs via a HUD user feedback input device, the HUD user feedback input device configured to receive one or more user inputs, the HUD user feedback input device communicatively coupled to the at least one processor;

generating one or more control signals for the one or more controllable cells of the grid of the adjusted dynamic map based on the one or more inputs;

providing the one or more control signals to one or more HUD controls, the one or more HUD controls communicatively coupled to the at least one processor; and utilizing the one or more control signals to adjust at least one of a brightness or a contrast of the HUD image projector to improve the average contrast ratio of the HUD image projector.

17. A system, comprising:

at least one non-transitory computer-readable medium;

at least one aircraft processor communicatively coupled to the at least one non-transitory computer-readable medium;

at least one HUD sensor communicatively coupled to the at least one aircraft processor, the at least one HUD sensor configured to acquire one or more images of an entire field of view (FOV); and a high dynamic range head up-display (HUD) communicatively coupled with the at least one aircraft processor, the HUD comprising:

a HUD image combiner positioned proximate to a windshield of a vehicle and configured to present HUD symbology to a user, the at least one HUD sensor configured to acquire the one or more images of the entire FOV through both the HUD image combiner and the windshield of the vehicle;

a HUD image projector configured to project the HUD symbology at least one of onto or through the HUD image combiner, the HUD image projector including a plurality of pixels, the HUD symbology being formed at least one of onto or through the HUD image combiner via a projection of at least one lit pixel of the plurality of pixels of the HUD image projector; and at least one HUD processor communicatively coupled to one or more of the at least one HUD sensor or the HUD image projector, the at least one HUD processor configured to:

process the one or more images for real-world luminance data over the entire FOV;

generate a dynamic map over the entire FOV of the HUD image projector, the dynamic map comprising a grid with one or more controllable cells based on the real-world luminance data of the entire FOV, each of the one or more controllable cells representing a subset of pixels of the plurality of pixels, each of the one or more controllable cells mapping to an area of the one or more images, each of the one or more controllable cells including a background luminance corresponding to the mapped area of the one or more images;

configure an average contrast ratio of the HUD image projector based on the dynamic map; and configure the HUD image projector to optimize the average contrast ratio based on the generated dynamic map by adjusting at least one backlight brightness of a subset of pixels of the plurality of pixels represented by a respective controllable cell of the one or more controllable cells based on the background luminance corresponding to the mapped area of the one or more images.

18. The system of claim 17, the at least one HUD processor further configured to:

generate one or more control signals for the one or more controllable cells of the grid of the dynamic map;

provide the one or more control signals to one or more HUD controls, the one or more HUD controls communicatively coupled to the at least one HUD processor; and utilize the one or more control signals to adjust at least one of a brightness or a contrast of the HUD image projector to improve the average contrast ratio of the HUD image projector.

* * * * *